United States Patent
Kim et al.

(10) Patent No.: US 10,754,178 B2
(45) Date of Patent: *Aug. 25, 2020

(54) SMART CONTACT LENSES FOR AUGMENTED REALITY AND METHODS OF MANUFACTURING AND OPERATING THE SAME

(71) Applicant: Samsung Electronics Co., Ltd., Suwon-si, Gyeonggi-do (KR)

(72) Inventors: Taeho Kim, Suwon-si (KR); Sungwoo Hwang, Seoul (KR); Sangwon Kim, Seoul (KR); Hoyoung Ahn, Suwon-si (KR); Daeyoung Chung, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,469

(22) Filed: Apr. 23, 2019

(65) Prior Publication Data

US 2019/0250432 A1    Aug. 15, 2019

Related U.S. Application Data

(63) Continuation of application No. 14/644,488, filed on Mar. 11, 2015, now Pat. No. 10,359,648.

(30) Foreign Application Priority Data

Sep. 26, 2014    (KR) ........................ 10-2014-0129517

(51) Int. Cl.
*G02C 11/00* (2006.01)
*G02C 7/04* (2006.01)

(52) U.S. Cl.
CPC ................ *G02C 11/10* (2013.01); *G02C 7/04* (2013.01)

(58) Field of Classification Search
CPC .......... G02C 11/10; G02C 7/04; G02C 11/00; G02B 2027/0178; G02B 27/017
(Continued)

(56) References Cited

U.S. PATENT DOCUMENTS 5,108,427 A    4/1992   Majercik et al.
7,626,562 B2  12/2009   Iwasaki
(Continued)

FOREIGN PATENT DOCUMENTS

CN    103442884 A    12/2013
EP     2447757 A1     5/2012
(Continued)

OTHER PUBLICATIONS

IEEE, Augmented Reality in a Contact Lens, Illustration by Emily Cooper, May 1, 2012 (Year: 2012).*
(Continued)

*Primary Examiner* — William R Alexander
*Assistant Examiner* — Henry A Duong
(74) *Attorney, Agent, or Firm* — Harness, Dickey & Pierce, P.L.C.

(57) ABSTRACT

Example embodiments disclose a smart contact lens for augmented reality and methods of manufacturing and operating the smart contact lens. The smart contact lens includes a first contact lens, a display unit in a center region of the first contact lens, a peripheral device on the first contact lens and around the display unit, the peripheral device being connected to the display unit, and a passivation layer covering the display unit and the peripheral device. The method of manufacturing the smart contact lens includes forming a display unit; mounting the display unit in a center region of a first contact lens, forming a peripheral device on the first contact lens, around the display unit and in connection with
(Continued)

the display unit, and forming a passivation layer to cover the display unit and the peripheral device.

29 Claims, 21 Drawing Sheets

(58) Field of Classification Search
USPC .......................................................... 351/158
See application file for complete search history.

(56) References Cited

U.S. PATENT DOCUMENTS

| | | | |
|---|---|---|---|
| 7,949,024 | B2 | 5/2011 | Joseph |
| 8,096,654 | B2 | 1/2012 | Amirparviz et al. |
| 8,552,436 | B2 | 10/2013 | Bibl et al. |
| 8,857,983 | B2 | 10/2014 | Pugh et al. |
| 9,804,418 | B2 | 10/2017 | Pugh et al. |
| 2005/0237483 | A1 | 10/2005 | Phelan |
| 2007/0067329 | A1* | 3/2007 | Kamvar .............. H04W 28/085 |
| 2009/0189830 | A1 | 7/2009 | Deering et al. |
| 2010/0103368 | A1 | 4/2010 | Amirparviz et al. |
| 2012/0140167 | A1 | 6/2012 | Blum |
| 2013/0194540 | A1 | 8/2013 | Pugh et al. |
| 2014/0005514 | A1 | 1/2014 | Pugh et al. |
| 2014/0098226 | A1 | 4/2014 | Pletcher et al. |
| 2014/0197558 | A1 | 7/2014 | Linhardt et al. |
| 2014/0200424 | A1 | 7/2014 | Etzkorn et al. |
| 2015/0005602 | A1 | 1/2015 | Linhardt et al. |
| 2015/0148648 | A1 | 5/2015 | Pugh |
| 2015/0160475 | A1 | 6/2015 | Yang et al. |
| 2015/0261294 | A1* | 9/2015 | Urbach ................... G06F 3/013 345/156 |
| 2015/0378176 | A1 | 12/2015 | Flitsch et al. |
| 2016/0097940 | A1* | 4/2016 | Sako ....................... G02C 7/101 351/158 |
| 2017/0333892 | A1 | 11/2017 | Rupley |

FOREIGN PATENT DOCUMENTS

| | | |
|---|---|---|
| JP | H07121114 A | 5/1995 |
| KR | 20100123755 A | 11/2010 |
| RU | 2374784 C2 | 11/2009 |
| WO | WO-2006-015315 A2 | 2/2006 |
| WO | WO-2008-109867 A2 | 9/2008 |

OTHER PUBLICATIONS

Chinese Office Action and English translation thereof dated Jun. 3, 2019.
Babak A. Parviz, "Augmented Reality in a Contact Lens", Sep. 1, 2009, http://spectrum.ieee.org/biomedical/bionics/augmented-reality-in-a-contact-lens#, pp. 1-7.
Chinese Office Action and English translation thereof dated Sep. 5, 2018.
IEEE, "Augmented Reality in a Contact Lens," Illustration by Emily Cooper, May 1, 2012.
Parviz, Babak, A., "Augmented Reality in a Contact Lens," https://spectrum.ieee.org/biomedical/bionics/augmented-reality-in-a-contact-lens, Sep. 1, 2009.

* cited by examiner

SMART CONTACT LENSES FOR AUGMENTED REALITY AND METHODS OF MANUFACTURING AND OPERATING THE SAME

RELATED APPLICATION

This application is a continuation of and claims priority under 35 U.S.C. § 120/121 to U.S. application Ser. No. 14/644,488, filed Mar. 11, 2015, which claims the benefit of Korean Patent Application No. 10-2014-0129517, filed on Sep. 26, 2014, in the Korean Intellectual Property Office, the disclosure of each of which are incorporated herein in its entirety by reference.

BACKGROUND

1. Field

The present disclosure relates to a portable or wearable display, and more particularly, to smart contact lenses for augmented reality and methods of manufacturing and operating the smart contact lens.

2. Description of the Related Art

Recently, wearable devices or other variable devices combined with existing portable devices for providing improved functions have been much researched, and some of such devices have been commercialized as products.

Along with the popularization of smartphones, such devices are configured to include parts operable in an interacting relationship with smartphones and displays for displaying information. Examples of such devices include head-up displays and Google Glass™. However, since the devices are mounted on wearers' heads and project images onto glasses, the image quality and viewing angle of the devices may be affected or narrowed according to motion of the wearers. Thus, the devices may be unsuitable for realizing augmented reality.

SUMMARY

Provided are smart contact lenses capable of clearly providing information regardless of movement of a wearer and a focal length and increasing the angle of view.

Provided are methods of manufacturing the smart contact lenses.

Provided are methods of operating the smart contact lenses.

Additional aspects will be set forth in part in the description which follows and, in part, will be apparent from the description, or may be learned by practice of example embodiments.

According to an example embodiment, a smart contact lens includes a first contact lens, a display unit in a center region of the first contact lens, a peripheral device on the first contact lens and around the display unit, the peripheral device being connected to the display unit, and a passivation layer covering the display unit and the peripheral device.

The first contact lens includes a groove in the center region of the first contact lens, and the display unit in the groove.

The display unit may be attached to the first contact lens by an adhesive material.

The smart contact lens may further include a second material layer that covers the passivation layer and makes hermetic contact with the first contact lens around the passivation layer.

The smart contact lens may further include a second contact lens covering the passivation layer.

The display unit may include a transparent substrate layer, a switch array layer on the transparent substrate layer, a light emission layer on the switch array layer, and an electrode layer on the light emission layer.

The peripheral device may include an antenna through which information may be transmitted to or from an external device, a capacitor configured to supply power to the display unit and a portion of the peripheral device, a control unit configured to control operations of the display unit and the peripheral device, a motion sensor configured to detect movement of the smart contact lens, and a thin-film camera.

The transparent substrate layer may include a microlens array including a plurality of microlenses, and the microlens array may have a varying microlens distribution density.

The light emission layer may include a light emission device array having a plurality of light emission devices, and the light emission device array may have a varying light emission device distribution density. In this case, the light emission device distribution density may be relatively higher in a center region of the light emission device array and may decrease in a direction away from a center of the light emission device array.

According to another example embodiment, a method of manufacturing a smart contact lens includes forming a display unit, mounting the display unit in a center region of a first contact lens, forming a peripheral device on the first contact lens, around the display unit and in connection with the display unit, and forming a passivation layer to cover the display unit and the peripheral device.

The forming of the display unit may include forming a transparent substrate layer on a curved surface of a mold layer, transferring a switch array layer to the transparent substrate layer, transferring a light emission layer to the switch array layer, and forming wires to connect devices of the switch array layer with devices of the light emission layer.

The transferring the switch array layer and the light emission layer may include transfer-printing.

The transparent substrate layer may include a microlens array including a plurality of microlenses, the microlens array may have a varying microlens distribution density.

The light emission layer may include a light emission device array having a plurality of light emission devices, the light emission device array having a varying light emission device distribution density.

The wires may have a three-dimensional pop-up structure or a filamentary serpentine structure.

The mounting the display unit may include forming a groove in the center region of the first contact lens, and disposing the display unit in the groove.

The mounting the display unit may include applying an adhesive material to the center region of the first contact lens, and attaching the display unit to the center region of the first contact lens.

The manufacturing method may further include forming a material layer on the first contact lens to cover the passivation layer. In this case, the material layer includes the same material as a material used to form the first contact lens.

The manufacturing method may further include forming a second contact lens on the first contact lens to cover the passivation layer.

The forming the peripheral device may include forming a device layer on a substrate, separating the device layer from the substrate, flattening the first contact lens by pulling the first contact lens in at least one direction, transferring the device layer to the flattened first contact lens, forming wires to connect the device layer and the display unit, and returning the first contact lens to an original shape. The wires may have a filamentary serpentine structure.

The transferring the light emission layer may include forming an array including a plurality of light emission devices on a silicon substrate, transferring the array to a flexible substrate, deforming the flexible substrate in a curved shape such that the array has a curvature corresponding to the curved surface of the mold layer, and transferring the array to the switch array layer and removing the flexible substrate.

According to another example embodiment, a method of operating a smart contact lens includes receiving information, transmitting the information to a display unit, and projecting light directly onto a retina using the display unit, the light including the information.

The receiving receives the information from an external device.

The external device may include a program interacting with the smart contact lens.

Prior to the receiving the information, the operating method may further include detecting an object, the object being in view of a wearer of the smart contact lens, capturing an image of the object, and providing the image to the external device.

The providing the image to the external device may include sending a search request signal related to the object to the external device.

The information may include search results related to the object. Alternatively, the information may be provided by the external device.

BRIEF DESCRIPTION OF THE DRAWINGS

These and/or other aspects will become apparent and more readily appreciated from the following description of example embodiments, taken in conjunction with the accompanying drawings in which.

DETAILED DESCRIPTION

Figure 1:
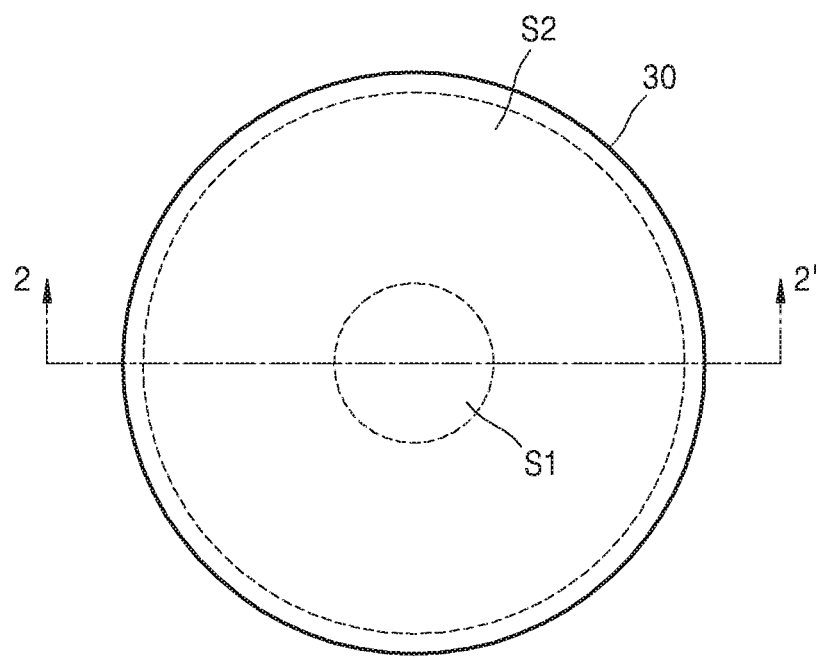
FIG. 1 is a plan view distinguishably illustrating device formation regions of a smart contact lens according to an example embodiment.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., a 3D display device). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

Hereinafter, smart contact lenses for augmented reality and methods of manufacturing and operating the smart contact lens will be described in detail according to example embodiments with reference to the accompanying drawings. In the drawings, the thicknesses of layers or regions may be exaggerated for clarity.

First, a smart contact lens for augmented reality will be described according to an example embodiment.

Referring to FIG. 1, the smart contact lens includes a first region S1 for hard parts and a second region S2 for soft parts. The first region S1 is a center region of a contact lens 30, and the second region S2 is a region surrounding the first region S1. Display elements may be disposed in the first region S1, and elements (e.g. a power source or controller) for driving the display elements may be disposed in the second region S2. In addition, devices (e.g. an antenna or a wireless chipset) for transmitting information (data) to external devices and receiving information from the external devices, and an eyeball motion sensor may be disposed in the second region S2.

Figure 2:
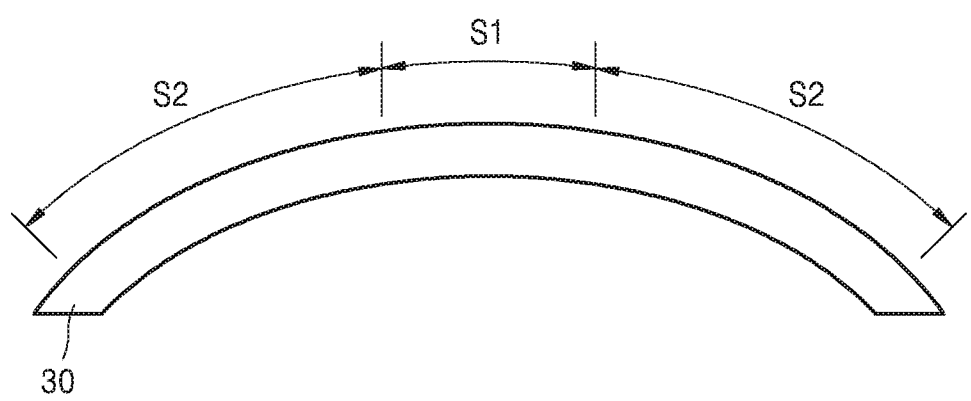
FIG. 2 is a cross-sectional view taken along line 2-2' of FIG. 1.

FIG. 2 is a cross-sectional view taken along line 2-2' of FIG. 1.

Referring to FIG. 2, the contact lens 30 may be an upwardly convex soft lens. The contact lens 30 may be a conventional lens.

Figure 3:
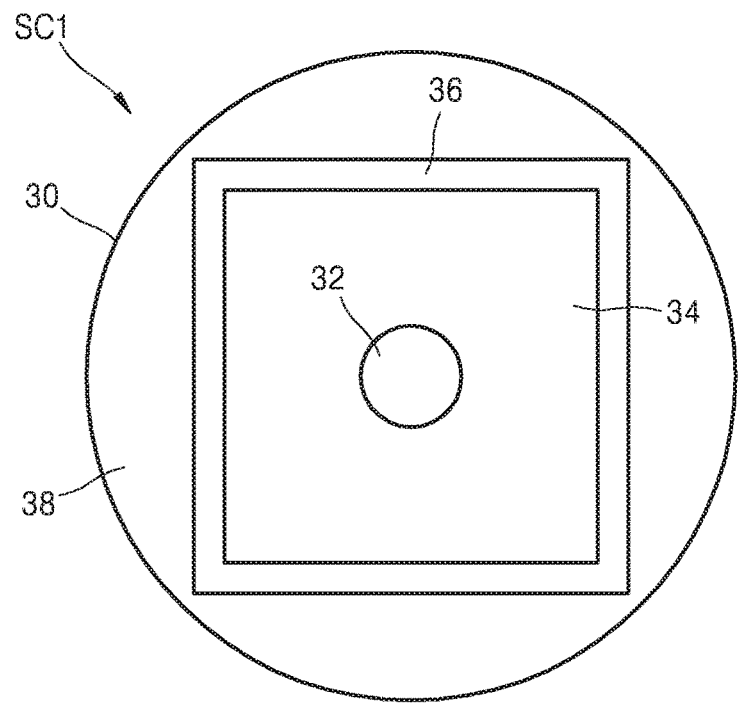
FIG. 3 is a plan view schematically illustrating an example structure of the smart contact lens of the example embodiment.

FIG. 3 is a plan view schematically illustrating a first smart contact lens SC1 according to an example embodiment.

Referring to FIG. 3, in the first smart contact lens SC1, a display unit 32 is disposed in a region corresponding to the first region S1 of the contact lens 30. A peripheral device 34 is disposed in a region corresponding to the second region S2 of the contact lens 30. The peripheral device 34 is disposed around the display unit 32. The peripheral device 34 may include a power source (e.g. a supercapacitor), an eyeball motion sensor, a controller for controlling the display unit 32, and an antenna unit for transmitting information to external devices and receiving information from the external devices. The peripheral device 34 may further include another element such as a camera. The power source of the peripheral device 34 may supply power to the display unit 32 and other elements of the peripheral device 34. At least a portion of power used by the elements of the peripheral device 34 may be supplied from the outside of the first smart contact lens SC1 by a wireless power transmission method using the antenna unit. The peripheral device 34 may be covered with a first material layer 36 formed of a patternable epoxy-containing material so as to prevent permeation of moisture and/or oxygen. The first material layer 36 may be transparent to light. For example, the first material layer 36 may be formed of SU8. As shown in FIG. 3, the peripheral device 34 may be entirely covered with the first material layer 36. However, the first material layer 36 may be patterned to individually cover the elements of the peripheral device 34 (individual passivation). The peripheral device 34 and the first material layer 36 may be covered with a second material layer 38. The second material layer 38 may entirely cover an upper surface of the contact lens 30. That is, the second material layer 38 may entirely cover an outer surface of the contact lens 30 that does not make contact with an eyeball.

Figure 4:
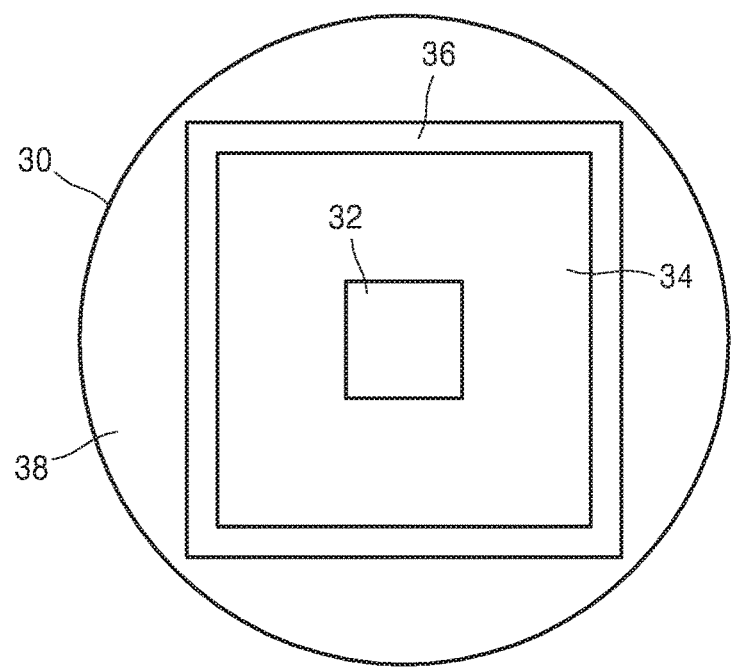
FIG. 4 is a plan view illustrating a case in which a display unit depicted in FIG. 3 has a tetragonal outer shape.

Referring to FIG. 3, the display unit 32 has a circular shape, and the outer edges (boundaries) of the peripheral device 34 and the first material layer 36 have a tetragonal shape. However, the display unit 32, the peripheral device 34, and the first material layer 36 may have other shapes. For example, the display unit 32 may have a tetragonal outer shape as shown in FIG. 4. In another example, the display unit 32 may have a tetragonal outer (edge) shape, and the peripheral device 34 may have a circular outer shape as shown in FIG. 5.

Figure 5:
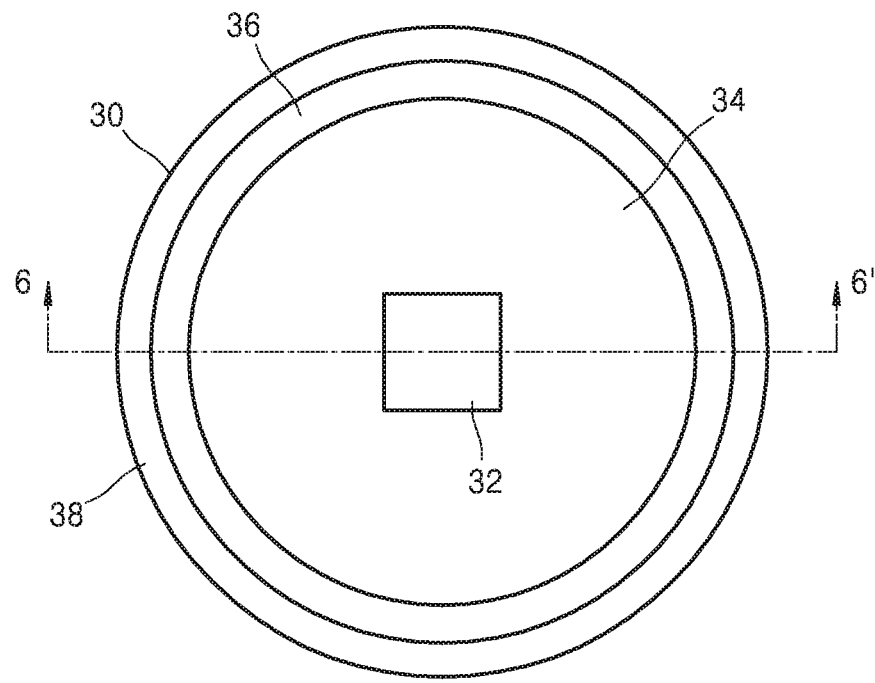
FIG. 5 is a plan view illustrating a case in which a peripheral device depicted in FIG. 3 has a circular outer (edge) shape.
Figure 6:
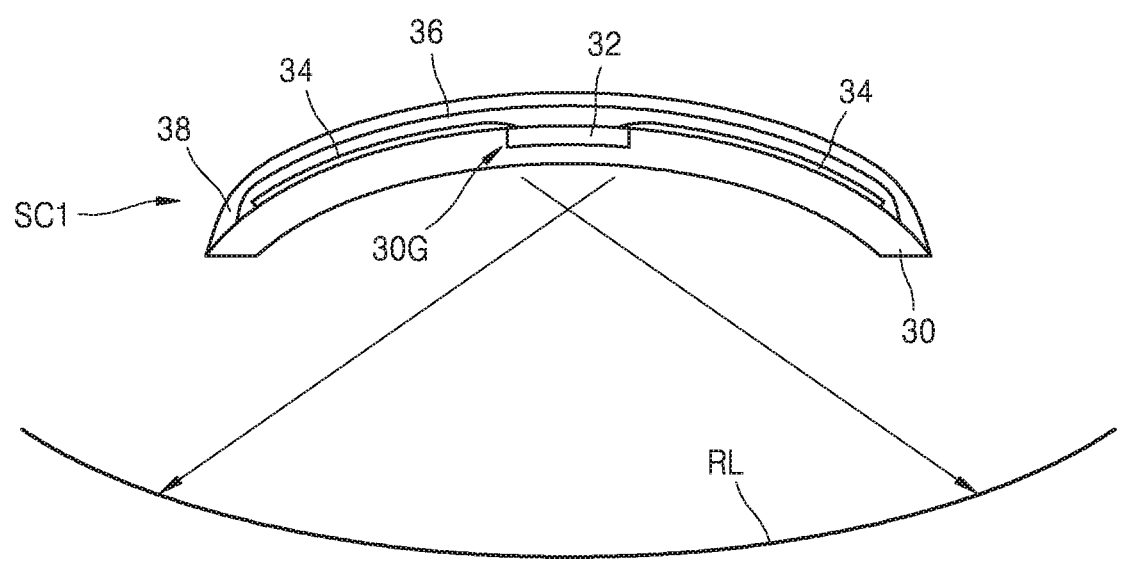
FIG. 6 is a cross-sectional view taken along line 6-6' of FIG. 5.

FIG. 6 is a cross-sectional view taken along line 6-6' of FIG. 5.

Referring to FIG. 6, the first smart contact lens SC1 includes the contact lens 30 and the elements 32, 34, 36, and 38 disposed on the upper surface of the contact lens 30. A lower surface of the contact lens 30 may make contact with an eyeball. The upper surface of the contact lens 30 does not make contact with an eyeball. The display unit 32, the peripheral device 34, the first material layer 36 for passivation, and the second material layer 38 for encapsulation may be disposed on the upper surface of the contact lens 30.

The display unit 32 may be disposed in the center region of the contact lens 30. The display unit 32 may be disposed such that the display unit 32 may display information on a retina RL. Accordingly, information (data) may be clearly displayed directly on a retina RL of a wearer of the contact lens 30 regardless of the focal length change of eyeball of the wearer. A groove 30G is formed in the center region of the contact lens 30. The groove 30G having a size corresponding to the size of the display unit 32 may be formed in the contact lens 30 when the contact lens 30 is manufactured. In this case, the depth of the groove 30G may be determined based on the thickness of the display unit 32. For example, the depth of the groove 30G may be equal to or smaller than the thickness of the display unit 32. However, the depth of the groove 30G may be greater than the thickness of the display unit 32. The peripheral device 34 covers a portion of the upper surface of the contact lens 30 that surrounds the groove 30G. The peripheral device 34 may be in direct contact with the display unit 32 and may be electrically connected to the display unit 32. The first material layer 36 covers the display unit 32 and the peripheral device 34 and makes contact with the upper surface of the contact lens 30 around the peripheral device 34. The first material layer 36 may be in direct contact with the display unit 32 and the peripheral device 34. The first material layer 36 is covered with the second material layer 38 for encapsulation. The second material layer 38 may be in direct contact with the first material layer 36. The second material layer 38 is brought into hermetic contact with the upper surface of the contact lens 30 around the first material layer 36. The second material layer 38 may be formed of the same material as that used to form the contact lens 30.

Figure 7:
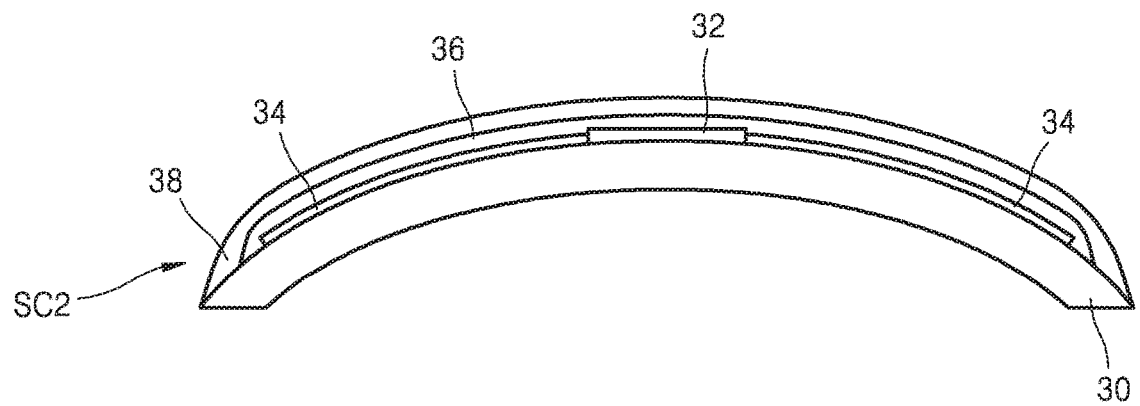
FIG. 7 is a cross-sectional view illustrating a smart contact lens according to another example embodiment.

FIG. 7 is a cross-sectional view illustrating a smart contact lens SC2 (hereinafter referred to a second smart contact lens SC2) according to another example embodiment. Only difference from the first smart contact lens SC1 illustrated in FIG. 6 will now be described.

Referring to FIG. 7, a contact lens 30 of the second smart contact lens SC2 does not include a groove. A display unit 32 is attached to an upper surface of the contact lens 30. The display unit 32 may be attached to the upper surface of the contact lens 30 by using an adhesive material. A first material layer 36 and a second material layer 38 around the display unit 32 may be configured and arranged in the same manner as shown in FIG. 6.

Figure 8:
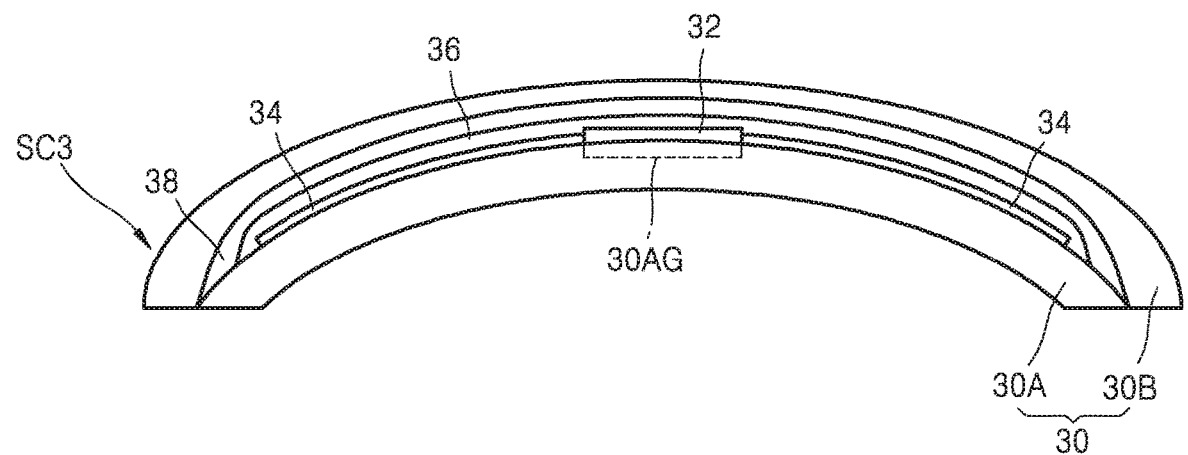
FIG. 8 is a cross-sectional view illustrating a smart contact lens according to another example embodiment.

FIG. 8 is a cross-sectional view illustrating a smart contact lens SC3 (hereinafter referred to a third smart contact lens SC3) according to another example embodiment.

Referring to FIG. 8, a contact lens 30 of the third smart contact lens SC3 includes a first contact lens 30A and a second contact lens 30B. The first and second contact lenses 30A and 30B are sequentially stacked. The first and second contact lenses 30A and 30B may be formed of the same material. The first contact lens 30A may be the same as the contact lens 30 described with respect to FIG. 6 or 7.

A display unit 32, a first material layer 36, and a second material layer 38 are arranged between the first and second contact lenses 30A and 30B. In this case, if the second contact lens 30B has an encapsulation function, the second material layer 38 may be omitted. The display unit 32, the first material layer 36, and the second material layer 38 are disposed on an upper surface of the first contact lens 30A, and the disposed structure thereof may be the same as that shown in FIG. 7. The display unit 32 may be attached to the upper surface of the first contact lens 30A. Alternatively, the display unit 32 may be disposed in a groove 30AG formed in a center region of the upper surface of the first contact lens 30A.

Figure 9:
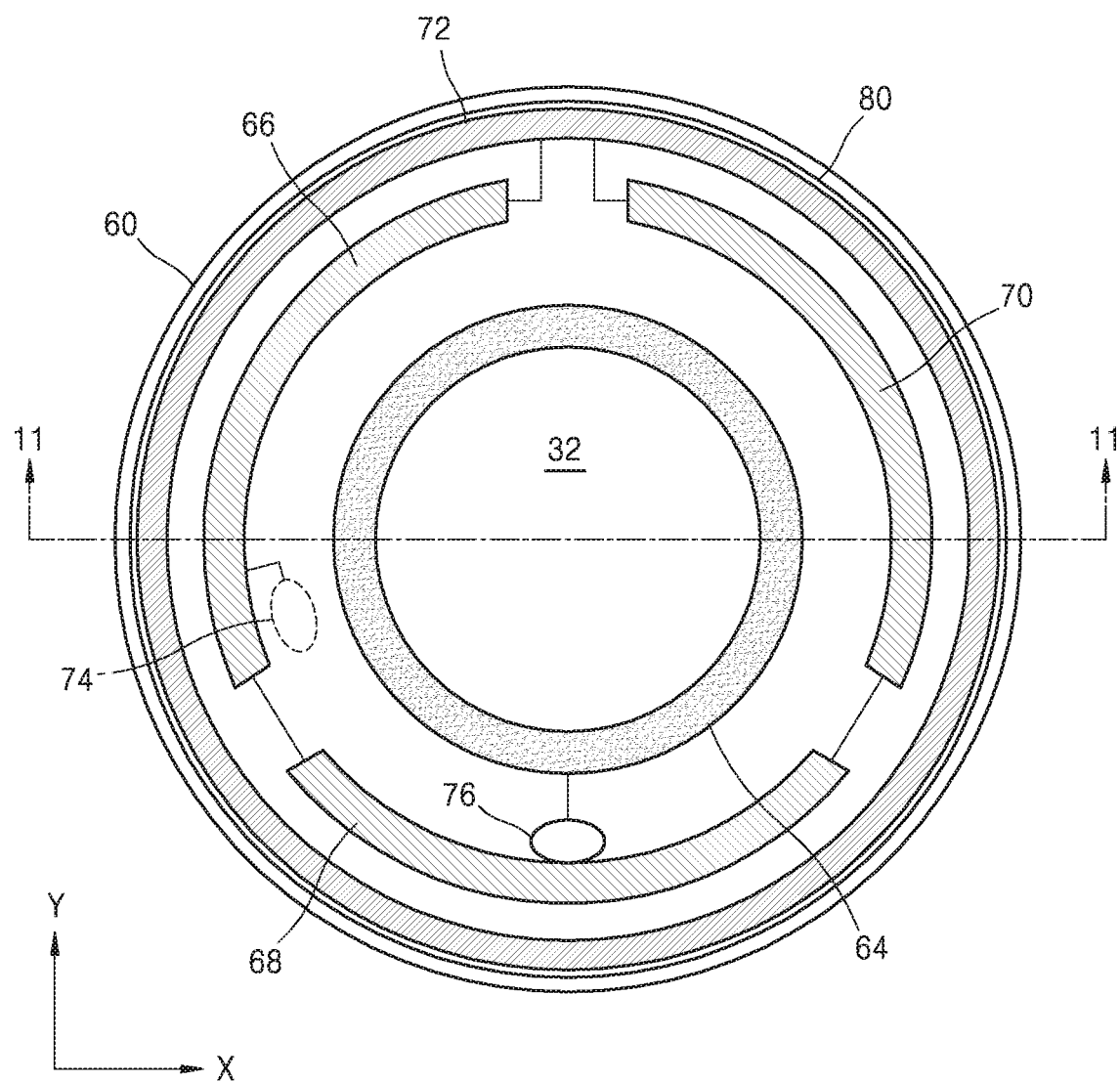
FIG. 9 is a plan view illustrating a structure of a peripheral device disposed on an upper surface of a contact lens of a smart contact lens according to an example embodiment.

FIG. 9 is a plan view illustrating an example structure of a peripheral device 34 disposed on an upper surface of a contact lens 30 according to an example embodiment.

Referring to FIG. 9, a wiring portion 64 is disposed around a display unit 32. The wiring portion 64 may include electric wires for connecting elements of the display unit 32. The wiring portion 64 may include a circuit related with the operation of the display unit 32. The wiring portion 64 may have a circular shape surrounding the display unit 32. A motion sensor 66, a capacitor 68, and a radio chipset 70 are disposed around the wiring portion 64. The motion sensor 66, the capacitor 68, and the radio chipset 70 are separate from the wiring portion 64. The motion sensor 66 and the radio chipset 70 may be electrically connected to the capacitor 68. The motion sensor 66 may detect motion of the contact lens 30, that is, motion of an eyeball, or blink of the eyeball. The capacitor 68 may be a supercapacitor. The capacitor 68 is connected to the wiring portion 64.

A control unit 76 may be disposed between the capacitor 68 and the wiring portion 64. The control unit 76 may be hardware, firmware, hardware executing software or any combination thereof. When the control unit 76 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the control unit 76. CPUs, DSPs, ASICs and FPGAs may generally be referred to as processors and/or microprocessors.

In the event where the control unit 76 is a processor executing software, the processor is configured as a special purpose machine to execute the software, stored in a storage medium, to perform the functions of the control unit 76.

The control unit 76 is electrically connected to the capacitor 68. The capacitor 68 may be connected to the wiring portion 64 through the control unit 76. The control unit 76 may control the operation of the display unit 32. For this, the control unit 76 may include a circuit. The control unit 76 may control an operation of delivering information (data) from an external device to the display unit 32 and an operation of projecting such information (data) onto a retina from the display unit 32. When information (data) is delivered from the external device to the display unit 32, the control unit 76 may process the information (data) into a format processable by the display unit 32. The control unit 76 may include a circuit for controlling operations of various elements of the peripheral device 34 (e.g. the motion sensor 66, the capacitor 68, and the radio chipset 70). A lens-less camera 74 may be disposed between the motion sensor 66 and the wiring portion 64. The camera 74 is separate from the wiring portion 64 and connected to the motion sensor 66. The camera 74 may interact with the motion sensor 66 and operate together the motion sensor 66. For example, the motion sensor 66 may detect a motion of an eyeball, and the camera 74 may photograph an object or background on which the eyeball is focused. If the eyeball focuses on an object or background for a set period of time or the number of blinks is equal to or greater than a set value, the camera 74 may be operated. This operation of the camera 74 may be controlled by the control unit 76. The motion sensor 66, the capacitor 68, and the radio chipset 70 are surrounded by a radio frequency (RF) antenna 72. The RF antenna 72 is disposed inside the edge of the contact lens 30. The RF antenna 72 has a closed circular shape completely surrounding the motion sensor 66, the capacitor 68, and the radio chipset 70. In other embodiments, however, the RF antenna 72 may have a partially opened circular shape. The RF antenna 72 may be one of devices which are used for receiving information (data) from the external device and transmitting information (data) to the external device. In addition, the RF antenna 72 may be one of devices which are used for receiving power from the external device by a wireless power transmission method. The external device may include a program for operating devices of the smart contact lens. The external device may be a portable device or a fixed device. For example, the portable device may be a mobile communication device. The RF antenna 72 is separate from the motion sensor 66, the capacitor 68, and the radio chipset 70. The motion sensor 66 and the radio chipset 70 may be connected to the RF antenna 72 through wires. The motion sensor 66 may not be directly connected to the RF antenna 72. The motion sensor 66 may be connected to the control unit 76. The motion sensor 66 may be connected to the radio chipset 70 directly or through the control unit 76. In this case, the operation of the motion sensor 66 may be controlled by the control unit 76. A passivation material layer 80 covers the peripheral device 34 and the display unit 32, and an encapsulation layer 60 covers the material layer 80.

Figure 10:
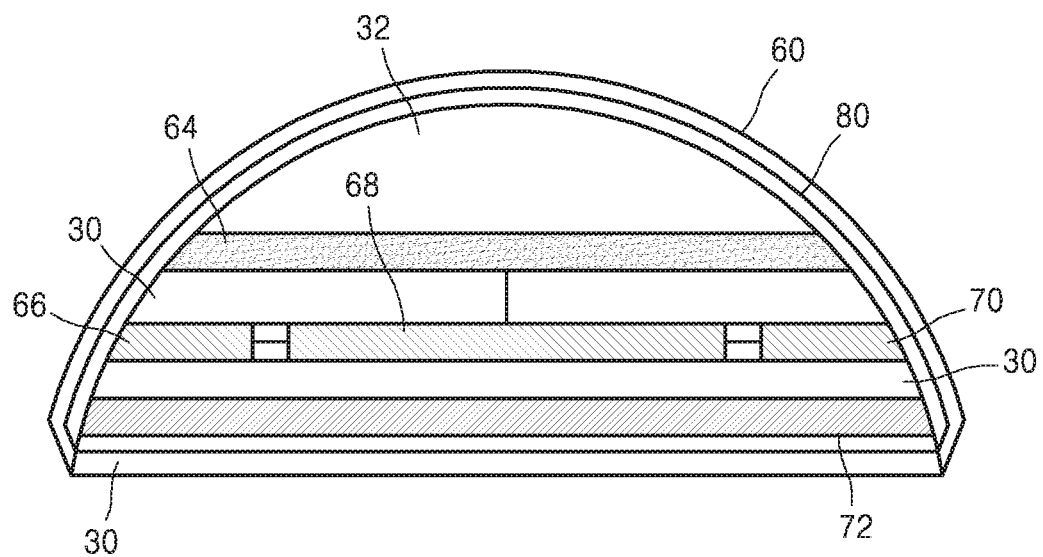
FIG. 10 is a side view from a y-axis direction of FIG. 9.

FIG. 10 is a side view from a y-axis direction of FIG. 9.

Referring to FIG. 10, the display unit 32, the wiring portion 64, the motion sensor 66, the capacitor 68, the radio chipset 70, and the RF antenna 72 are covered with the material layer 80. The edge of the material layer 80 is in contact with the upper surface of the contact lens 30. The function and material of the material layer 80 may be the same as those of the first material layer 36 described above. The material layer 80 is covered with the encapsulation layer 60. The encapsulation layer 60 is brought into hermetic contact with the edge of the contact lens 30.

Figure 11:
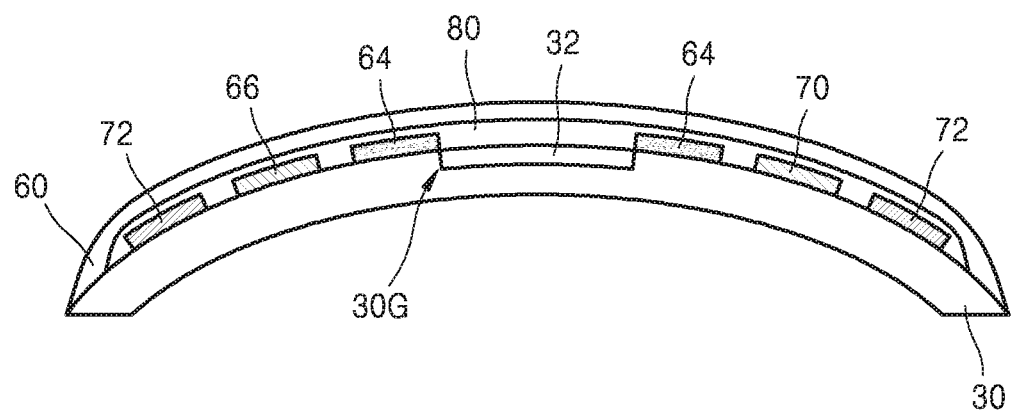
FIG. 11 is a cross-sectional view taken along line 11-11' of FIG. 9.

FIG. 11 is a cross-sectional view taken along line 11-11' of FIG. 9.

Referring to FIG. 11, a groove 30G is formed in a center region of the contact lens 30. The display unit 32 is disposed in the groove 30G. The thickness of the display unit 32 may be equal to the depth of the groove 30G. The wiring portion 64 is disposed on the upper surface of the contact lens 30 at both sides of the display unit 32. The motion sensor 66 is disposed at a left side of a left portion of the wiring portion 64, and the radio chipset 70 is disposed at a right side of a right portion of the wiring portion 64. The RF antenna 72 is disposed at a left side of the motion sensor 66 and a right side of the radio chipset 70. The RF antenna 72, the motion sensor 66, the radio chipset 70, the wiring portion 64, and the display unit 32 are covered with the material layer 80 for preventing permeation of impurities (e.g. oxygen or water). The material layer 80 is covered with the encapsulation layer 60.

Figure 12:
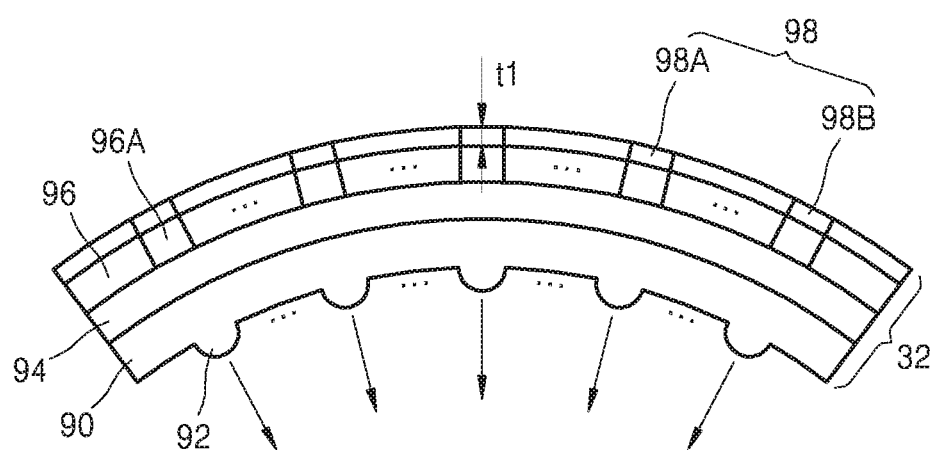
FIG. 12 is a cross-sectional view illustrating an example structure of a display unit depicted in FIG. 11.

FIG. 12 is a cross-sectional view illustrating a structure of the display unit 32 illustrated in FIG. 11, according to an example embodiment.

Referring to FIG. 12, the display unit 32 includes a transparent substrate layer 90, a switch array layer 94, a light emission layer 96, and an electrode layer 98 that are sequentially stacked. For example, the transparent substrate layer 90 may be a glass layer. The transparent substrate layer 90 has a curvature. The curvature of the transparent substrate layer 90 may be equal to the curvature of a portion of the contact lens 30 on which the display unit 32 is disposed. A plurality of microlenses 92 are disposed on a lower surface of the transparent substrate layer 90. The microlenses 92 form an array. When the microlenses 92 are formed, the focal lengths of the microlenses 92 may be adjusted. That is, condensing position of light beams (arrows) that is irradiated to a retina through the microlenses 92 may be controlled by the adjustment of the focal lengths of the microlenses 92. The switch array layer 94 which is transparent and attached to an upper surface of the transparent substrate layer 90 may include an array constituted by a plurality of transistors. However, the configuration of the switch array layer 94 is not limited to having transistors. The transistors may be operated by an active matrix method. The transistors may include field effect transistors (FETs) such as n-channel metal oxide semiconductor field effect transistors (NMOS-FEFs), or thin film transistors (TFTs). The switch array layer 94 may be separately formed and then may be transferred to the transparent substrate layer 90. Switching devices included in the switch array layer 94 may have a size of about 100 μm×100 μm or smaller. The light emission layer 96 formed on the switch array layer 94 may be used as a light source and may include an array constituted by a plurality of light emission devices 96A. The light emission devices 96A may be operated by an active matrix method. The light emission devices 96A may include light emitting diodes (LEDs) such as infrared LEDs (ILEDs), quantum dot LEDs (QD-LEDs), or organic LEDs (OLEDs). The light emission devices 96A may have a size of about 100 μm×100 μm or smaller. The light emission devices 96A are formed by an epitaxial growth method. The light emission devices 96A of the light emission layer 96 may correspond to the microlenses 92 in a one-to-one manner. The microlenses 92 condense light emitted from the light emission devices 96A so that the light may be focused on a retina. The minimal interval between the light emission devices 96A of the light emission layer 96 may be greater than an interval (hereinafter referred to as a limit interval) at which a wearer of the contact lens 30 can detect the existence of the light emission devices 96A when the wearer perceives an object. Therefore, the light emission devices 96A do not obstruct the field of view of the wearer. The distribution density of the light emission devices 96A may be varied according to regions of the light emission layer 96 and also the intervals between the light emission devices 96A may be the limit interval or more. This will be described later in detail. The electrode layer 98 is formed on the light emission layer 96. The electrode layer 98 includes a plurality of first electrodes 98A and a plurality of second electrodes 98B. The first and second electrodes 98A and 98B are horizontal and vertical lines crossing each other. The light emission devices 96A are disposed at crossing positions of the first and second electrodes 98A and 98B. In FIG. 12, the first and second electrodes 98A and 98B are in contact with each other. However, the first and second electrodes 98A and 98B may not be in contact with each other. The first and second electrodes 98A and 98B may have a thickness of about 20 μm to about 30 μm. The area of the electrode layer 98 may be about 5% to about 15% of the entire area of a region in which the electrode layer 98 is distributed. That is, about 85% to 95% of the region in which the electrode layer 98 is distributed may be empty. Therefore, the first and second electrodes 98A and 98B of the electrode layer 98 may not obstruct a wearer's field of view.

The distribution density of the microlenses 92 may be varied according to regions of the transparent substrate layer 90. An example thereof is illustrated in FIG. 13.

Figure 13:
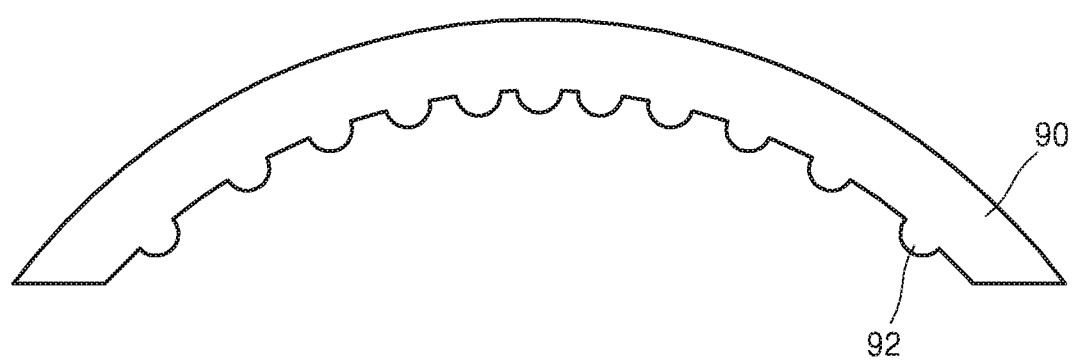
FIG. 13 is a cross-sectional view illustrating a distribution density of microlenses on a transparent substrate layer depicted in FIG. 12.

Referring to FIG. 13, the distribution density of the microlenses 92 may be increased in a direction toward the center of the transparent substrate layer 90. In other words, the distribution density of the microlenses 92 may be highest in a center region of the transparent substrate layer 90 and decreases gradually in a direction away from the center of the transparent substrate layer 90. The distribution density of the light emission devices 96A of the light emission layer 96 may be the same as the distribution density of the microlenses 92. In other words, the distribution density of the light emission devices 96A is highest in a center region of the light emission layer 96 and decreases gradually in a direction away from the center of the light emission layer 96. The distribution density of the switching devices of the switch array layer 94 may be similar to the distribution density of the light emission devices 96A. The distribution density of the microlenses 92 will be described later in more detail, and the description may also applied to the light emission devices 96A and the switch array layer 94.

Figure 14:
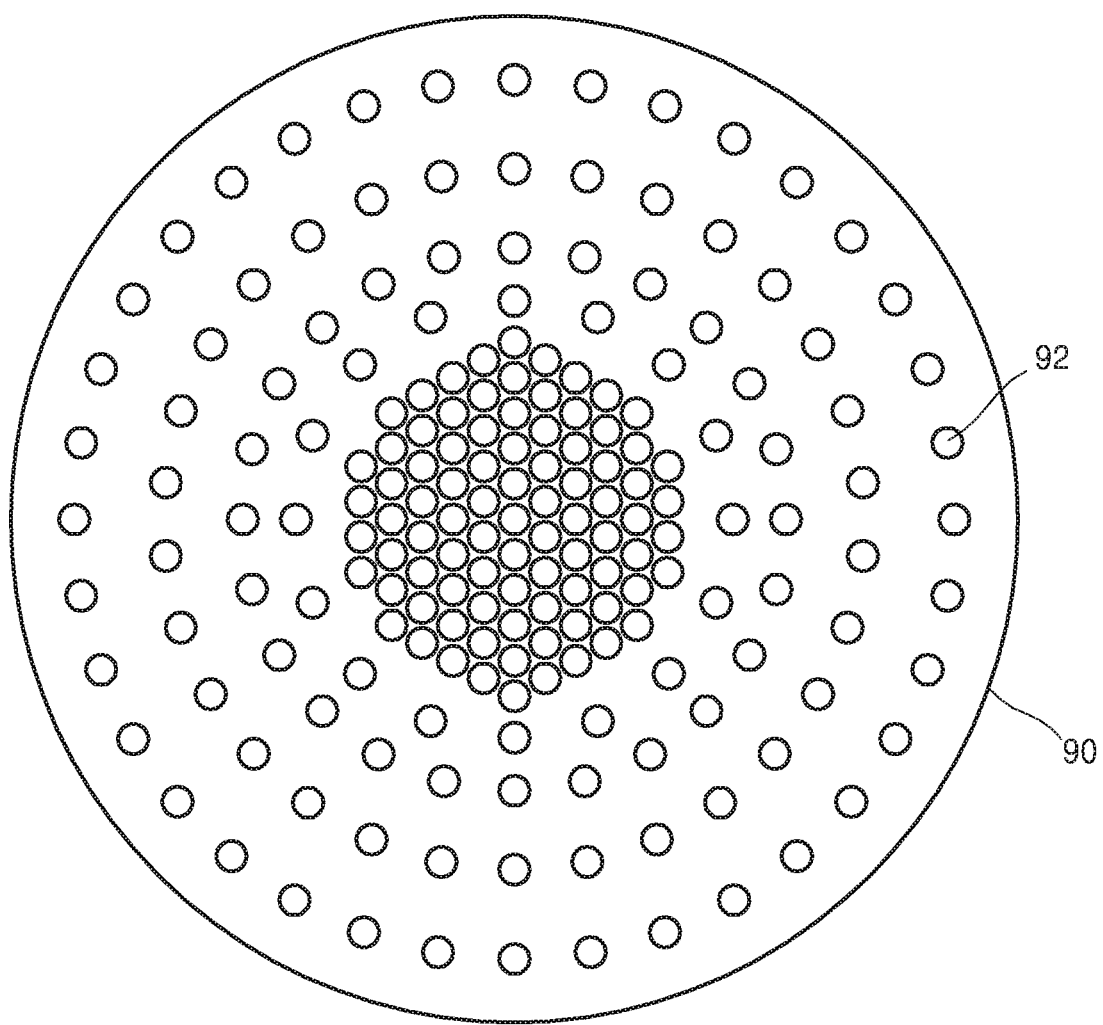
FIGS. 14 and 15 are bottom views illustrating the distribution density of the microlenses of the transparent substrate layer depicted in FIG. 13.
Figure 15:
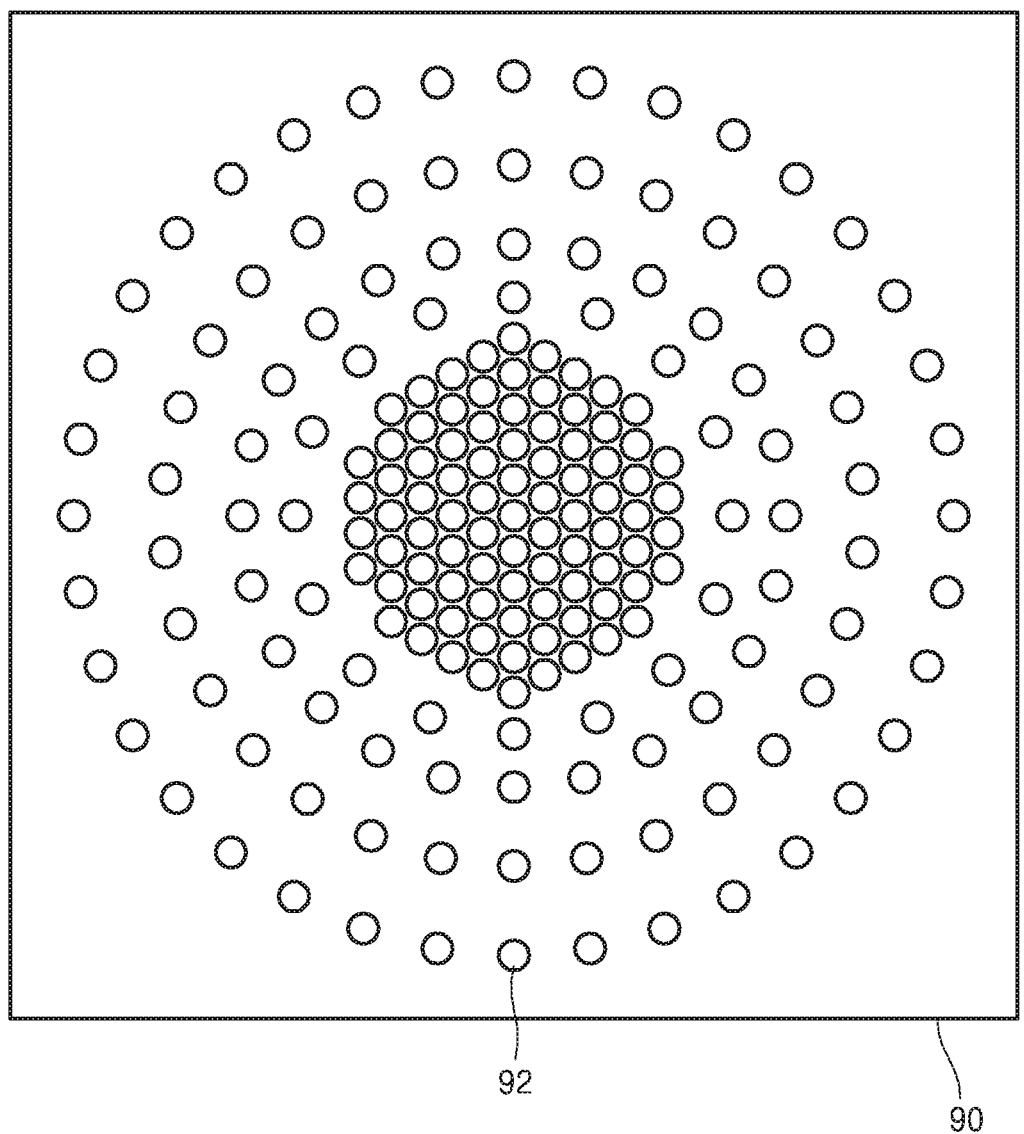

FIGS. 14 and 15 are bottom views illustrating the distribution density of the microlenses 92 of the transparent substrate layer 90 illustrated in FIG. 13.

Referring to FIG. 14, as described above, the distribution density of the microlenses 92 is highest in the center region of the transparent substrate layer 90 and decreases gradually in a direction toward the edge of the transparent substrate layer 90. The microlenses 92 may correspond to the light emission devices 96A in an one-to-one manner. FIG. 14 illustrates the case in which the transparent substrate layer 90 has a circular shape, that is, the case in which the display unit 32 has a circular shape. FIG. 15 illustrates the case in which the transparent substrate layer 90 has a tetragonal shape.

The light emission devices 96A of the light emission layer 96 may constitute pixels. The distribution density of the microlenses 92 may be applied to the distribution density of the light emission devices 96A. Therefore, resolution may be relatively high in the center region of the light emission layer 96 and may decrease in a direction toward the edge of the light emission layer 96. That is, resolution may be highest in a center region of the display unit 32 and may decrease in a direction toward the edge of the display unit 32.

Figure 16:
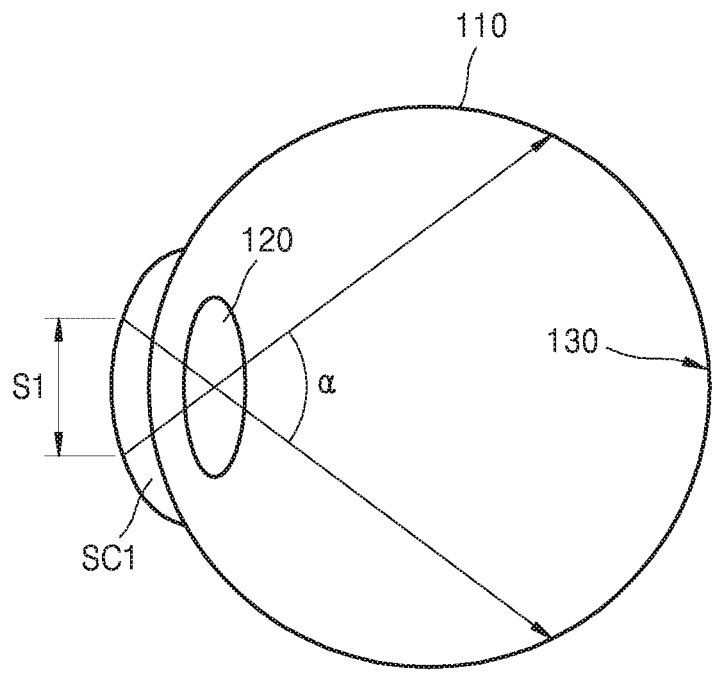
FIG. 16 is a cross-sectional view illustrating a case in which information (data) is projected onto a retina through a smart contact lens according to an example embodiment.

FIG. 16 is a cross-sectional view illustrating an example case in which information (data) is projected onto a retina 130 through a smart contact lens according to an example embodiment.

Referring to FIG. 16, a horizontally and vertically reversed image (for example, information or data) is projected onto the retina 130 through a crystalline lens 120 from a display unit 32 disposed in a first region S1 of the smart contact lens (SC1, SC2, or SC3) making contact with an eyeball 110. Since the display unit 32 is disposed on or in a contact lens 30, the angle of light projected from the display unit 32 toward the retina 130 is relatively large compared to the case in which the display unit 32 is spaced apart from the contact lens 30. This results in a large angle of view (a). In addition, the size of a region of the retina 130 in which information (data) is displayed may be adjusted by varying the range of a region of a light emission layer 96 of the display unit 32 used for emitting light (that is, used for displaying information).

Next, a method of manufacturing a smart contact lens will be described according to an example embodiment with reference to FIGS. 17 to 29. In the following description, the same elements as those described above are denoted by the same reference numerals, and descriptions thereof are not repeated.

First, a process of manufacturing a display unit 32 having the above-described structure will be described in detail.

Figure 17:
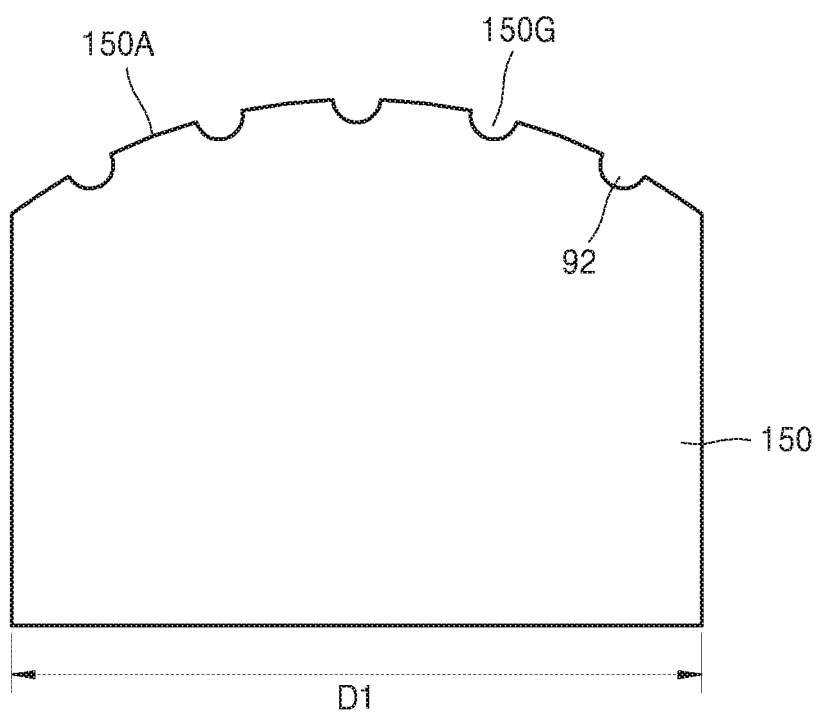
FIGS. 17 to 27 are cross-sectional views sequentially illustrating a method of manufacturing a smart contact lens according to an embodiment.

Referring to FIG. 17, a rigid mold (or a mold layer) 150 is prepared. An upper surface 150A of the mold 150 is a convex surface having a predetermined curvature. The mold 150 has a plurality of recesses 150G formed in the upper surface 150A thereof. The recesses 150G are for forming microlenses 92. The number of recesses 150G formed in the upper surface 150A may be equal to the number of the microlenses 92 to be formed. The mold 150 may have a diameter D1 of about 2.2 mm.

Figure 18:
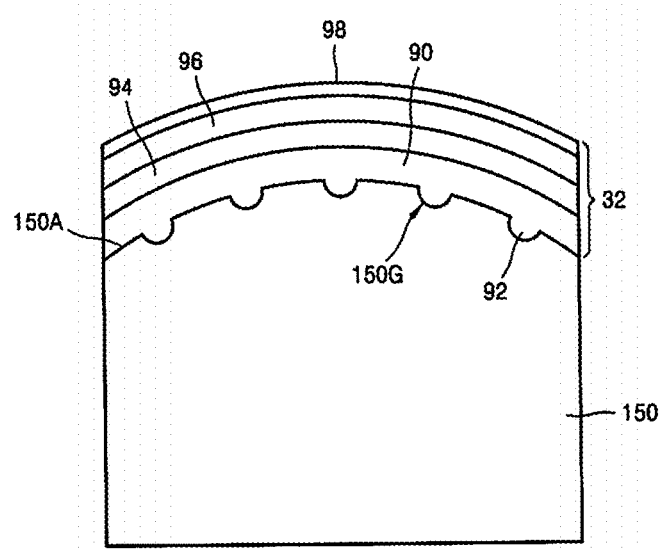

Referring to FIG. 18, a transparent substrate layer 90 is formed on the upper surface 150A of the mold 150 to fill the recesses 150G. Next, a switch array layer 94 is formed on the transparent substrate layer 90. The switch array layer 94 may be transferred to the transparent substrate layer 90 from another place by a transfer-printing method. For example, a transistor array including a plurality of transistors may be formed on a silicon substrate such as a single crystal silicon substrate. Then, the silicon substrate may be back-etched, and the transistor array may be transferred to the transparent substrate layer 90 using a stamp. In this way, the switch array layer 94 may be formed.

Next, a light emission layer 96 is formed on the switch array layer 94. The light emission layer 96 may be formed in a separate place and then may be transferred to the switch array layer 94 by a transfer-printing method. The formation of the light emission layer 96 will be described later in more detail. After the light emission layer 96 is formed, devices included in the switch array layer 94 and devices included in the light emission layer 96 are connected to each other by using gold (Au) or a transparent material (such as graphene). The connection may have an extensible structure such as a three-dimensional pop-up structure or a filamentary serpentine structure. Next, an electrode layer 98 is formed on the light emission layer 96. In this manner, the display unit 32 is formed.

Figure 19:
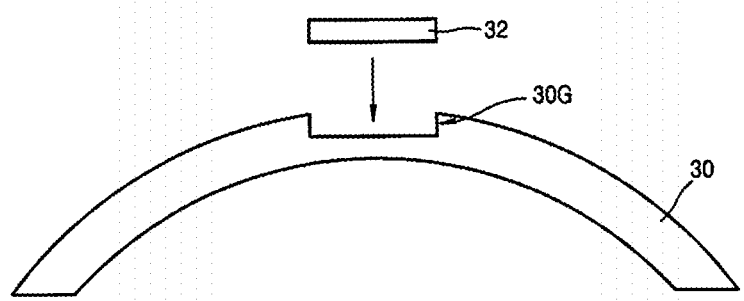

The display unit 32 formed as described above is picked up from the mold 150 by using a micro-structured stamp, and is transferred to a groove 30G formed in a center region of a contact lens 30 as shown in FIG. 19.

In this case, the transferring may be performed using the alignment method as a nanoimprint method. The alignment method may have an alignment precision of about ±10 nm or less. Before the display unit 32 is transferred, the groove 30G may be formed in a center region of an upper surface of the contact lens 30. When the groove 30G is formed, the depth of the groove 30G may be determined based on the thickness of the display unit 32 to be transferred. The depth of the groove 30G may be equal to or different from the thickness of the display unit 32 to be transferred.

Alternatively, the display unit 32 may be attached to the center region of the upper surface of the contact lens 30 by using an adhesive material as shown in FIG. 7. In this case, the groove 30G may not be formed in the contact lens 30.

Figure 20:
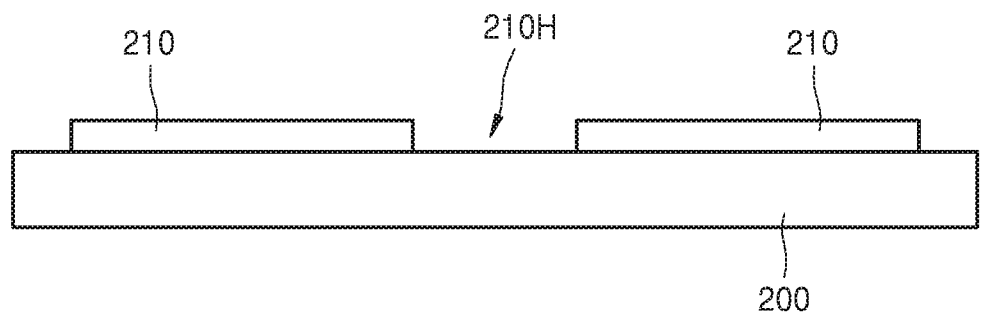

After the display unit 32 is transferred to the center region of the upper surface of the contact lens 30, a device layer 210 is formed on a substrate 200 as shown in FIG. 20. The substrate 200 may be a silicon substrate such as a single crystal silicon substrate. The device layer 210 may include the peripheral device 34 described with reference to FIGS. 3 to 9. The device layer 210 may be a layer including all elements disposed around the display unit 32 of the contact lens 30. Devices (such as a supercapacitor, a motion sensor, a display unit control circuit, a thin-film camera, an RF antenna, or a related chipset) included in the device layer 210 may be formed through a semiconductor manufacturing process of the related art. The device layer 210 may include wires connecting the devices to the display unit 32. Therefore, when the device layer 210 is transferred to the contact lens 30, the wires of the device layer 210 may be brought into contact with set positions of the display unit 32. The device layer 210 includes a penetration hole 210H in a center region thereof. The penetration hole 21 OH corresponds to the display unit 32.

Figure 21:
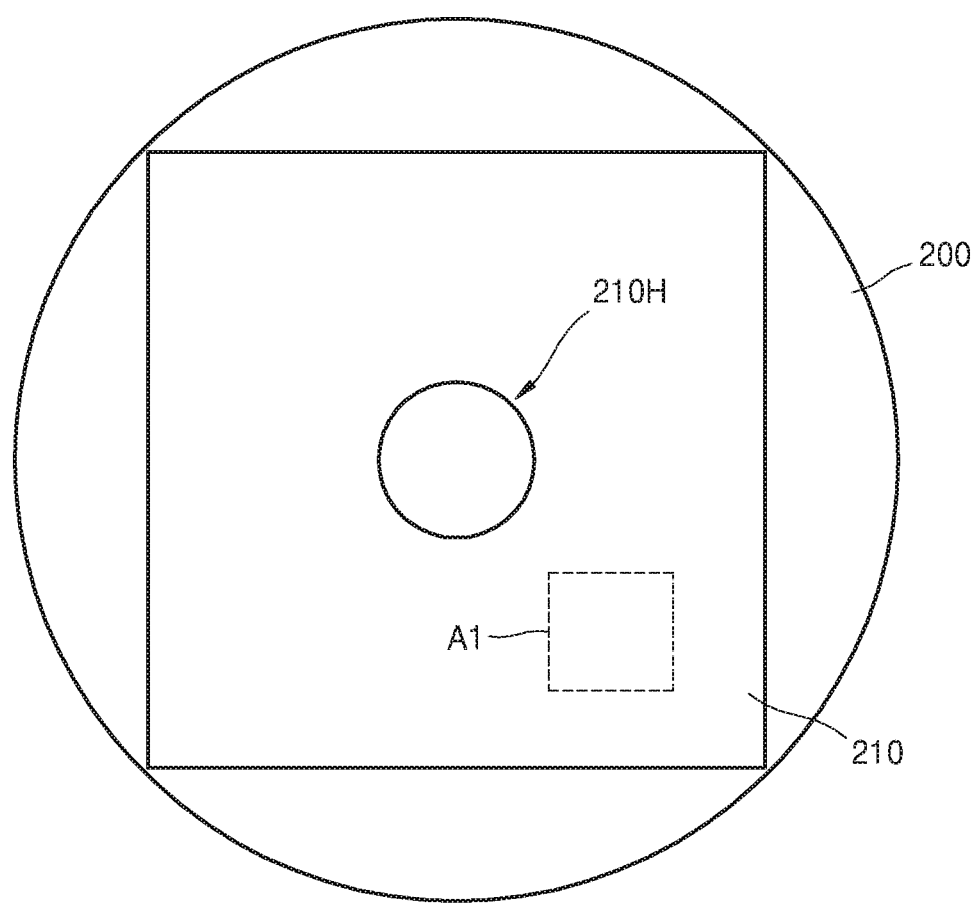

FIG. 21 is a plan view illustrating the device layer 210 and the substrate 200 illustrated in FIG. 20.

Figure 22:
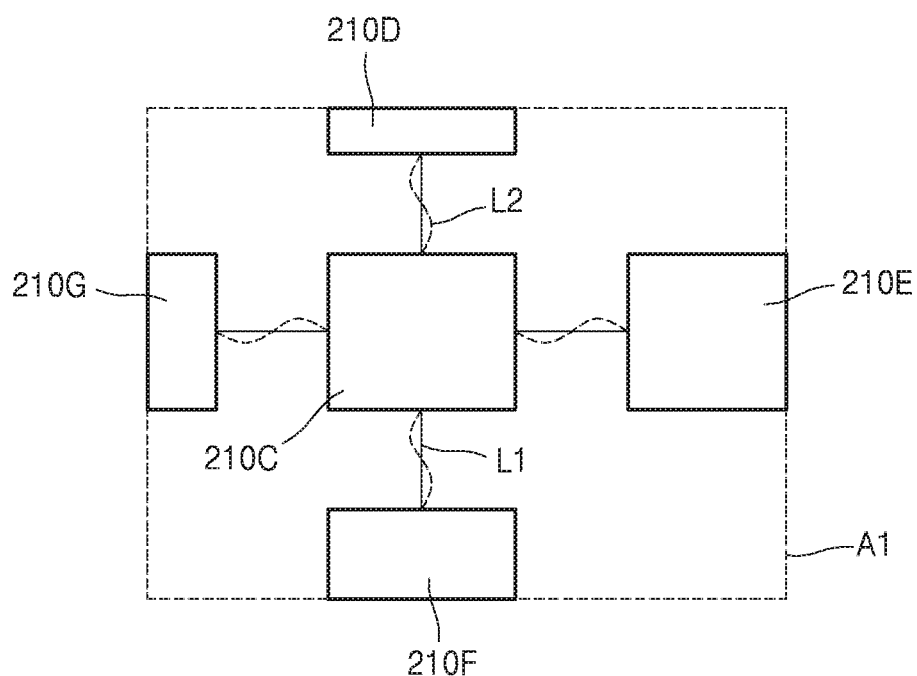

Referring to FIG. 21, the device layer 210 has a tetragonal shape. However, the device layer 210 may have a circular shape. FIG. 22 is an enlarged plan view illustrating a first region A1 illustrated in FIG. 21.

Referring to FIG. 22, a plurality of devices 210C to 210G are formed in the first region A1. The devices 210C to 210G are connected through wires L1. Some of the devices 210C to 210G may be the same. The wires L1 may be extendable filamentary serpentine wires as shown by dashed lines L2. Since the devices 210C to 210G are connected through the wires L1 which are stretchable, the device layer 210 may be bent in a curved shape after being separated from the substrate 200.

Figure 23:
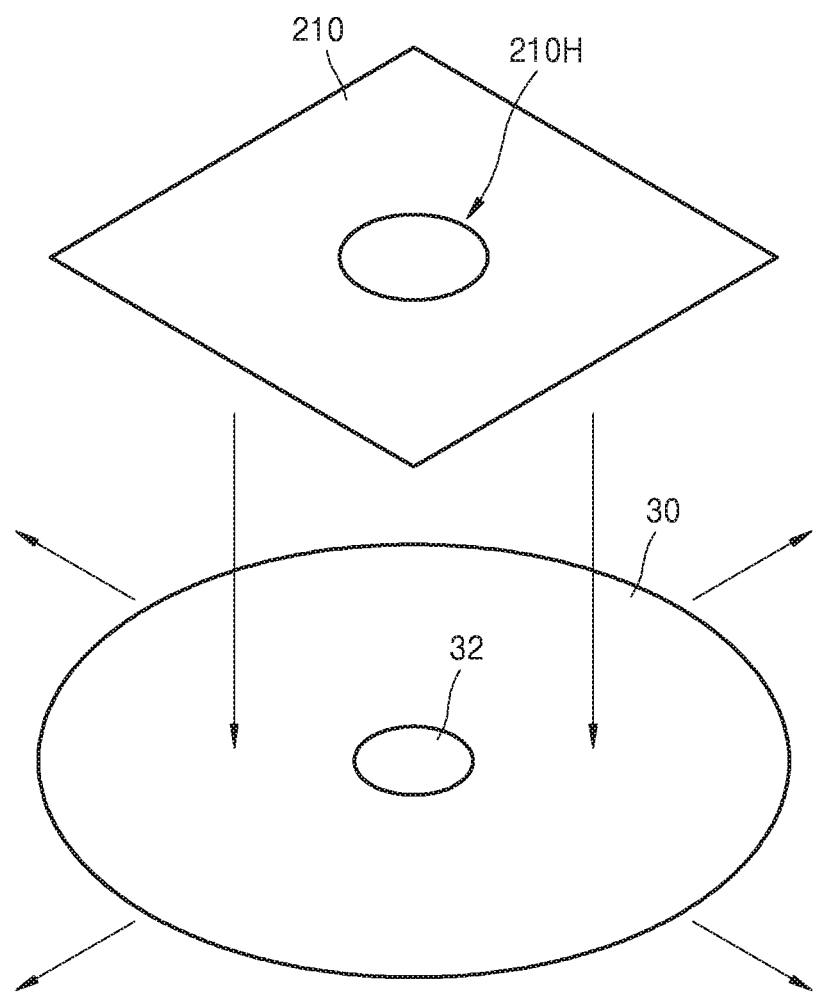

Next, the substrate 200 shown in FIG. 20 is back-etched, and as shown in FIG. 23, the device layer 210 is transferred using a stamp (not shown) to the contact lens 30 to which the display unit 32 has been transferred. In detail, the device layer 210 is placed such that the penetration hole 210H of the device layer 210 may be aligned with the display unit 32, and then the device layer 210 is transferred to the upper surface of the contact lens 30 around the display unit 32. Before the device layer 210 is transferred to the upper surface of the contact lens 30, the contact lens 30 is pulled in all directions or in radial directions and held flat. In this state, the device layer 210 is aligned and transferred to the upper surface of the contact lens 30.

Figure 24:
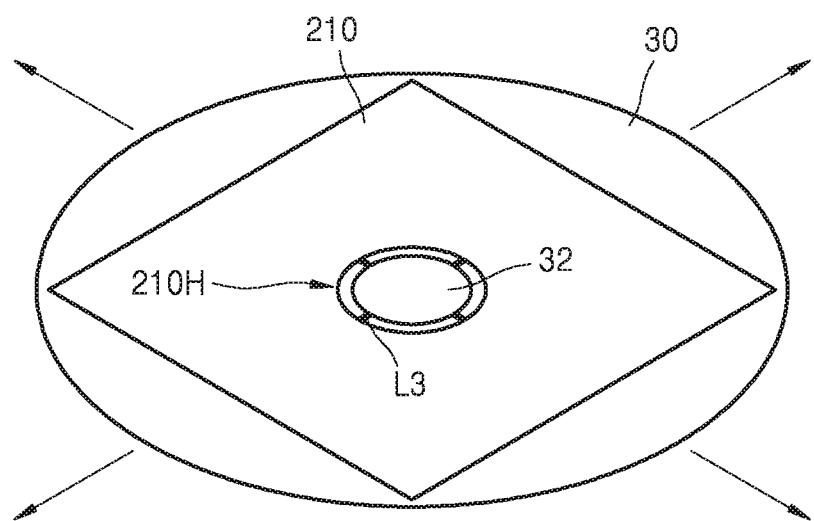

FIG. 24 is a plan view illustrating the device layer 210 transferred to the upper surface of the contact lens 30 that is held flat.

Referring to FIG. 24, the device layer 210 is attached to the upper surface of the contact lens 30 around the display unit 32. In this state, wires L3 may be formed to connect the device layer 210 and the display unit 32.

Figure 25:
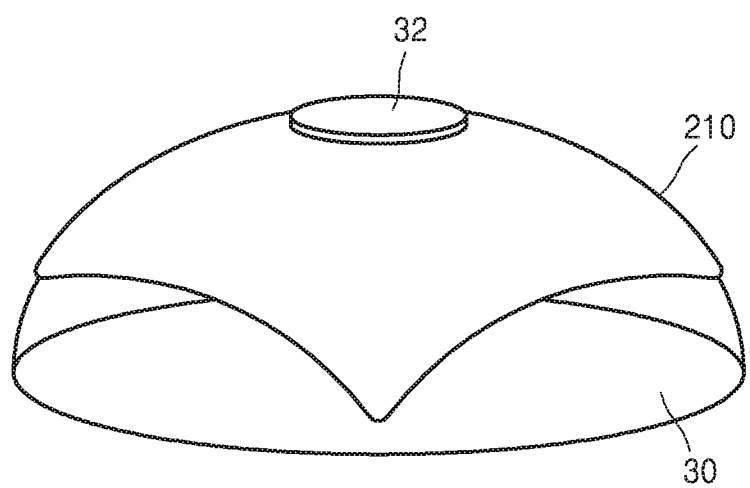

After the wires L3 are formed, the contact lens 30 is freely released. Then, the contact lens 30 returns to its original shape as shown in FIG. 25. Therefore, the device layer 210 is curved like the upper surface of the contact lens 30. In this manner, the device layer 210 is formed on the upper surface of the contact lens 30 around the display unit 32.

Figure 26:
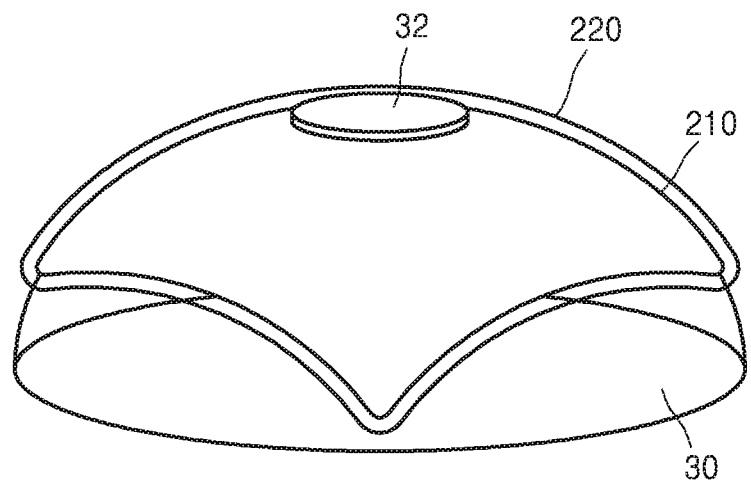

Next, referring to FIG. 26, a passivation layer 220 is formed on the upper surface of the contact lens 30 to cover the display unit 32 and the device layer 210. The passivation layer 220 entirely covers the display unit 32 and the device layer 210 and makes contact with a portion of the upper surface of the contact lens 30 around the device layer 210. The passivation layer 220 may be a patternable epoxy-containing material layer such as a SU8 layer or a polymethylmethacrylate (PMMA) layer.

Figure 27:
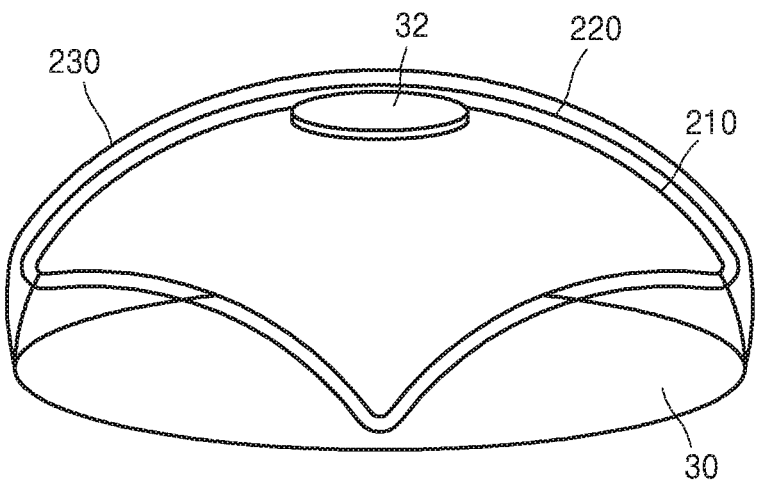

Referring to FIG. 27, after the passivation layer 220 is formed, an encapsulation layer 230 is formed on the upper surface of the contact lens 30 to cover the passivation layer 220. The encapsulation layer 230 may entirely cover the passivation layer 220 and the upper surface of the contact lens 30. The encapsulation layer 230 may be formed of the same material as that used to form the contact lens 30, such as a hydrogel. If the encapsulation layer 230 is formed of the same material as that used to form the contact lens 30, the encapsulation layer 230 and the contact lens 30 may form an upper layer and a lower layer of a lens. For example, the contact lens 30 shown in FIG. 27 may correspond to the first contact lens 30A shown in FIG. 8, and the encapsulation layer 230 shown in FIG. 27 may correspond to the second contact lens 30B shown in FIG. 8.

Next, a process of attaching the light emission layer 96 to the transparent substrate layer 90 of the display unit 32 will be described with reference to FIGS. 28 to 31.

Figure 28:
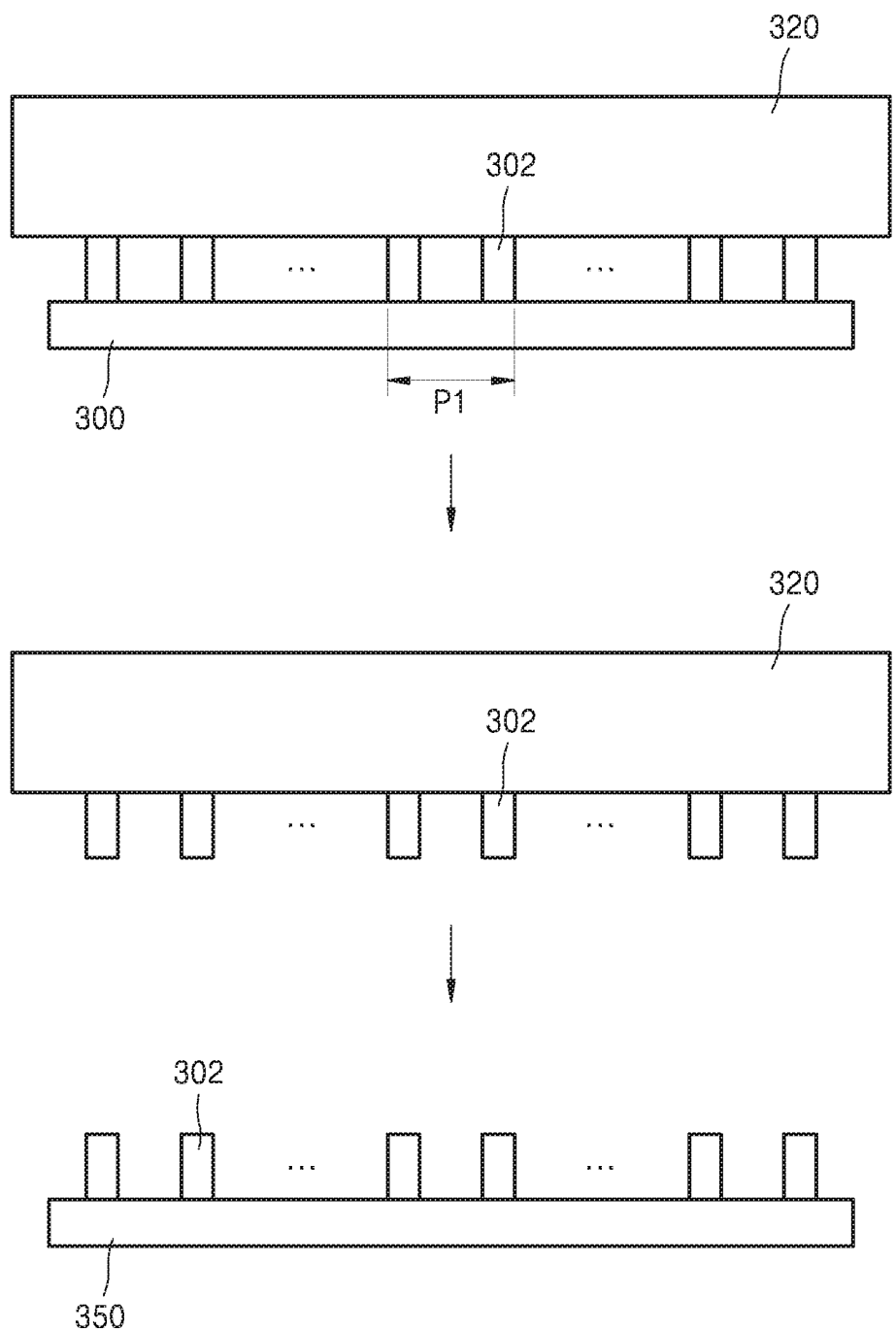
FIGS. 28 to 31 are cross-sectional views sequentially illustrating a process of attaching a light emission layer to a transparent substrate layer.

Referring to FIG. 28, a plurality of light emitting devices 302 are formed on a substrate 300. since the light emitting devices 302 are to be included in the display unit 32, the light emitting devices 302 may be formed as an array as shown in FIGS. 12 to 15. That is, in the array of the light emitting devices 302, the distribution density of the light emitting devices 302 is relatively high in a first region P1 corresponding to a center region of a retina and is gradually decreased in a direction away from the first region P1. In FIG. 28, the light emitting devices 302 are shown as being uniformly distributed for ease of illustration. The light emitting devices 302 may be LEDs or laser diodes (LDs). The light emitting devices 302 may be formed by an epitaxial growth method. However, the light emitting devices 302 are not limited thereto.

Next, after the light emitting devices 302 are formed on the substrate 300, the light emitting devices 302 are separated from the substrate 300 using a stamp 320. For example, the stamp 320 may be an elastomer stamp. The light emitting devices 302 separated from the substrate 300 using the stamp 320 are transferred to a flexible substrate 350. Thereafter, the stamp 320 is removed. For example, the flexible substrate 350 may be a rubber substrate.

Figure 29:
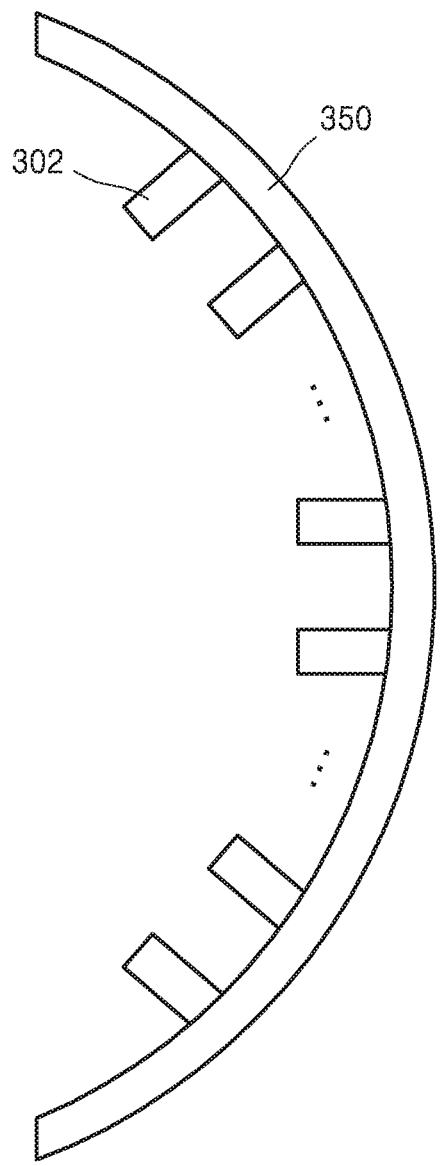
Figure 30:
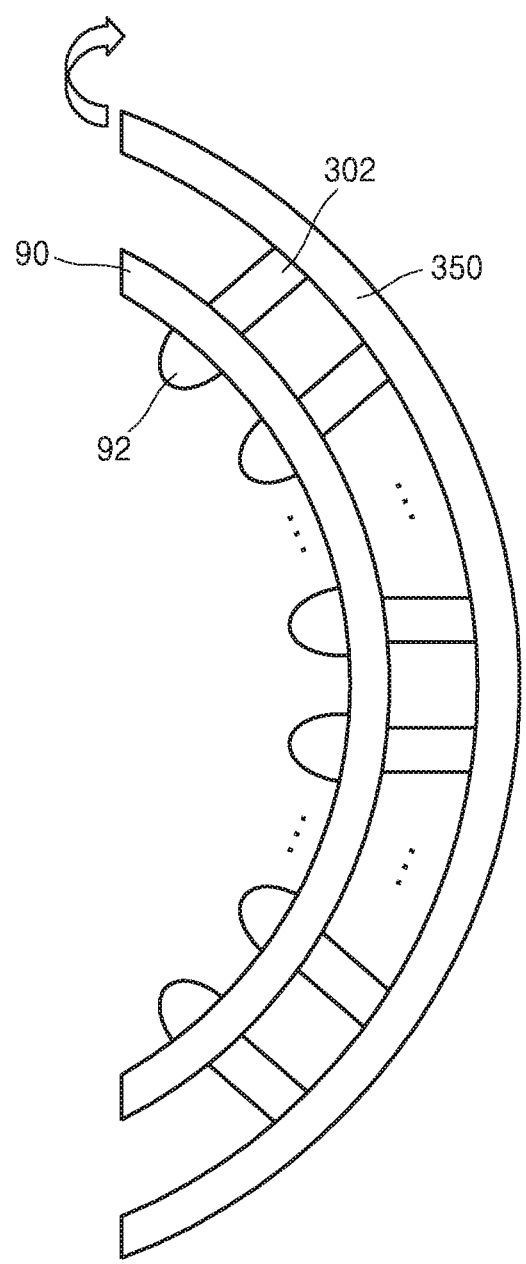

Next, as shown in FIG. 29, the flexible substrate 350 is deformed in a curved shape by an air pressurizing method. At this time, the flexible substrate 350 is deformed such that the light emitting devices 302 are disposed inside the curved shape of the flexible substrate 350. Then, an outer curved surface of the flexible substrate 350, that is, a convex surface of the flexible substrate 350, becomes a lower surface. When the flexible substrate 350 is deformed in a curved shape, the curvature of the transparent substrate layer 90 of the display unit 32 is considered. The curvature of the flexible substrate 350 may be adjusted by varying the pressure of pressurizing air. After the flexible substrate 350 is deformed according to the curvature of the transparent substrate layer 90, as shown in FIG. 30, the light emitting devices 302 are transferred to the transparent substrate layer 90. The transferring of the light emitting devices 302 may be performed by aligning the flexible substrate 350 in such a manner that the light emitting devices 302 may correspond to the microlenses 92 of the transparent substrate layer 90 in a one-to-one manner, attaching the light emitting devices 302 to the transparent substrate layer 90, and removing the flexible substrate 350.

Figure 31:
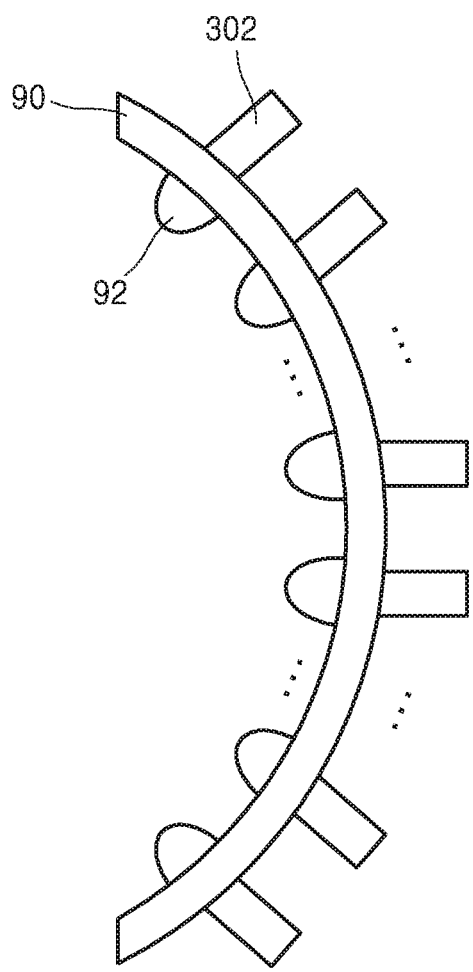

FIG. 31 illustrates the light emitting devices 302 transferred to the transparent substrate layer 90.

If the structure of the display unit 32 described above is considered, the light emitting devices 302 have to be transferred to the switch array layer 94. However, since procedures for transferring the light emitting devices 302 are not changed according to a surface to which the light emitting devices 302 are transferred, the light emitting devices 302 are shown as being transferred directly to the transparent substrate layer 90 in FIGS. 28 to 31 for ease of illustration.

In the above-described method of manufacturing a smart contact lens, both the display unit 32 and the device layer 210 may be formed on a substrate, and then the display unit 32 and the device layer 210 may be transferred to the contact lens 30 at a time.

Next, a method of operating a smart contact lens will be described.

Figure 32:
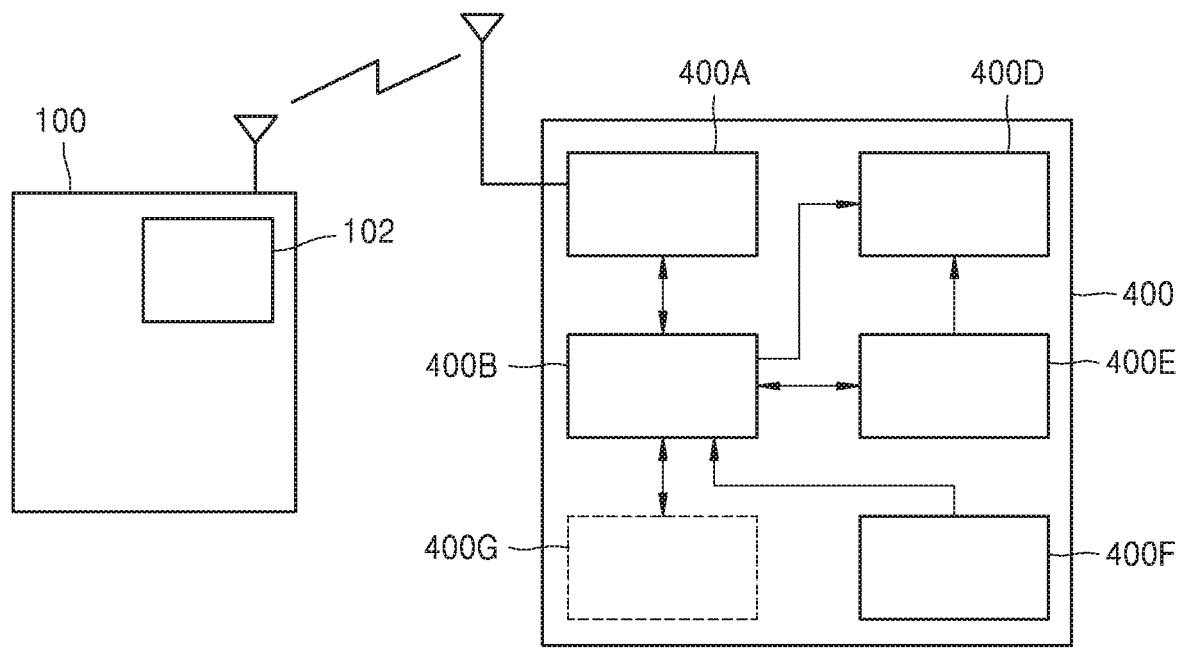
FIG. 32 is a block diagram illustrating a method of operating a smart contact lens according to an example embodiment.

Referring to FIG. 32, a smart contact lens 400 may be operated using an external device 100. The external device 100 may include a program (such as an app) 102 for operating the smart contact lens 400. If the program 102 of the external device 100 is executed, an operation start signal is transmitted from the external device 100 to the smart contact lens 400. The operation start signal may be a wireless signal. The smart contact lens 400 may start to operate in response to the operation start signal. For example, the external device 100 may be a mobile communication device. However, the external device 100 is not limited thereto. The external device 100 may be any kind of device capable of interacting with the smart contact lens 400. The smart contact lens 400 may be turned on/off under the control of the external device 100. If the program 102 of the external device 100 stops running, an operation stop signal may be transmitted to the smart contact lens 400 to stop the operation of the smart contact lens 400. Then, the smart contact lens 400 may only function as a general contact lens.

Although the external device 100 and the smart contact lens 400 are normally operated, if a wearer removes the smart contact lens 400 from his/her eyeball, the smart contact lens 400 may stop operation. Removal of the smart contact lens 400 from the wearer's eyeball may be detected using a motion sensor 400F included in the smart contact lens 400. The motion sensor 400F may be a pressure sensor. In addition, although the external device 100 operates normally, if the smart contact lens 400 is in a particular state (condition) for longer than a given period of time, the smart contact lens 400 may stop operation. Then, if the particular state (condition) disappears, the smart contact lens 400 may operate again. For example, while the external device 100 operates normally (that is, while the program 102 runs), if the field of view of the smart contact lens 400 is blocked for a given period of time or longer (for example, 10 seconds or longer), that is, if a wearer of the smart contact lens 400 closes his/her eyes for a given period of time or longer, the smart contact lens 400 may stop operation. After the given period of time, if the field of view of the smart contact lens 400 is opened and the external device 100 is still in normal operation, the smart contact lens 400 may operate again.

After the smart contact lens 400 starts to operate, if an operation signal (a first operation signal) is transmitted from the external device 100 to the smart contact lens 400, the smart contact lens 400 may operate as follows.

If the first operation signal or the first operation signal and information (data) are transmitted from the external device 100 by a wireless method, the smart contact lens 400 receives the first operation signal or the first operation signal and the information (data) through an antenna 400A thereof. Then, the first operation signal or the first operation signal and the information (data) are transmitted to a wireless chipset 400B and are interpreted, and then a processing signal or a processing signal and the information (data) may be transmitted to a corresponding device of the smart contact lens 400. For example, if the first operation signal is related with operation of a display unit 400D of the smart contact lens 400, and the information (data) is provided for the display unit 400D to project onto a wearer's retina according to the first operation signal, the wireless chipset 400B analyzes the first operation signal and delivers the information (data) and a processing signal for displaying the information (data) to the display unit 400D. Then, the display unit 400D is operated to display the information (data) directly on the wearer's retina according to the processing signal. Through this operation, information about an object (such as a particular product, building, street, or person) at which the wearer looks may be transmitted in real time to the brain of the wearer through the retina. Since the display unit 400D gives information about an object directly to the wearer's retina, the wearer may see the information (data) clearly. The wireless chipset 400B may correspond to the radio chipset 70 illustrated in FIG. 9.

If the wearer of the smart contact lens 400 wants to obtain information about an object, the wearer may look at the object as a preceding procedure for obtaining information about the object. For example, if the wearer looks at an object for a given period of time (for example, 3 seconds) or longer, the motion sensor 400F may inform the wireless chipset 400B of this event, and the wireless chipset 400B may send a search request signal related with the object to the external device 100 through the antenna 400A. At this time, if the smart contact lens 400 includes a lens-less thin-film camera 400G, the wireless chipset 400B may also send an image of the object taken using the lens-less thin-film camera 400G to the external device 100. Then, the external device 100 searches for information about the object and sends search results (information) to the wearer of the smart contact lens 400 by the above-described method.

If the field of view (images) of the wearer is transmitted from the smart contact lens 400 to the external device 100 (this may be possible owing to the lens-less thin-film camera 400G of the smart contact lens 400), objects at which the wearer looks may be displayed in real time on the external device 100. In this case, if an object is continuously displayed on the external device 100 for the given period of time or longer, even though the smart contact lens 400 does not transmit a search request signal to the external device 100, the external device 100 may search for information about the object and send search results (data) to the smart contact lens 400.

In addition, a video or photographs of images or objects at which the wearer looks may be taken using the lens-less thin-film camera 400G, and then may be stored in the external device 100. This operation may be initiated if a particular button provided on the external device 100 is pushed or touched or the wearer blinks a certain number of times. In the latter case, if the wearer blinks a set number of times or more (for example, two or more times) in quick succession, filming or photographing may start, and then if a set period of time elapses or the wearer blinks a set number of times or more (for example, two or more times) in quick succession, the filming or photographing may stop.

In addition, information (data) which the smart contact lens 400 has not requested may be sent from the external device 100 to the smart contact lens 400. For example, when the wearer drives a car, the external device 100 may search for road traffic information or navigation information, and the searched information may be transmitted to the smart contact lens 400 and displayed in the field of view of the wearer.

When the smart contact lens 400 operates, power necessary for operating devices (such as the wireless chipset 400B and the display unit 400D) of the smart contact lens 400 may be supplied from a capacitor 400E included in the smart contact lens 400. The capacitor 400E may be a supercapacitor. A least a portion of power necessary for operating the smart contact lens 400 and power necessary for charging the capacitor 400E may be supplied from the external device 100 by a wireless power supply method. A control unit may be used to control elements of the smart contact lens 400 shown in FIG. 32.

Figure 33:
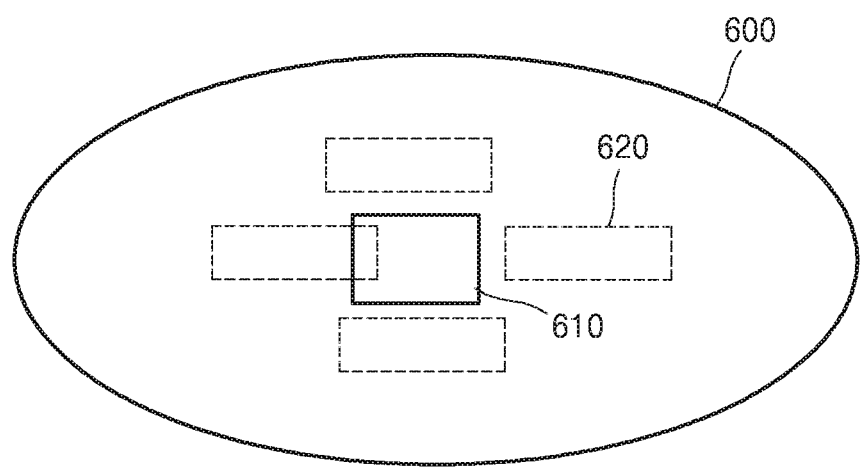
FIG. 33 is a view illustrating an object and information displayed together in a field of view of a wearer of a smart contact lens according to an example embodiment.

FIG. 33 illustrates an object and information displayed together in a field of view of a wearer of a smart contact lens according to an example embodiment.

In FIG. 33, reference numeral 600 refers to the field of view of the wearer. Reference numeral 610 refers to the object at which the wearer looks. Reference numeral 620 refers to the information (data) displayed in the field of view of the wearer. Although the information (data) 620 is projected onto a retina of the wearer, the wearer feels as if the information 620 is displayed around the object 610, for example, at the right, left, upper, or lower side of the object 610 in the field of view 600 of the wearer. The information 600 may be partially overlapped with the object 610 in the field of view 600 of the wearer.

As described above, according to the one or more of the above example embodiments, the smart contact lens may be referred to as an eye-mount display configured to display information (data) directly on the retina of a wearer. Therefore, eye-tracking may not be necessary, and information (data) may be clearly provided regardless of the length of a sight line or the focal length of an eye(s) of the wearer.

Furthermore, in the smart contact lens, the display unit may be disposed on the surface of the contact lens or in the contact lens, and a display region may be adjusted. Therefore, the field of view of the smart contact lens may be much larger than that of projection-type smart glasses that have been introduced. As a result, the smart contact lens may be more useful for realizing augmented reality.

In addition, the smart contact lens may interact with an external device such as a smartphone, and thus information about an object at which a wearer looks may be searched for in real time and may be directly transmitted to a retina of the wearer. Thus, the wearer of the smart contact lens may not need to look at a separate display (such as a display of a smartphone) for searching for information about an object and reading search results.

Furthermore, since the smart contact lens has a camera function and is capable of displaying navigation information provided by an external device, the smart contact lens may provide more convenient functions than existing portable devices.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A smart contact lens comprising:
   a first contact lens;
   a display unit in a center region of the first contact lens;
   a peripheral device on the first contact lens and around the display unit, the peripheral device being connected to the display unit; and
   a passivation layer covering the display unit and the peripheral device,
   wherein the first contact lens includes a groove in the center region of the first contact lens, the display unit is in the groove and a size of the groove corresponds to a size of the display unit.

2. The smart contact lens of claim 1, further comprising:
   a second material layer that covers the passivation layer and makes hermetic contact with the first contact lens around the passivation layer.

3. The smart contact lens of claim 1, further comprising:
   a second contact lens covering the passivation layer.

4. The smart contact lens of claim 1, wherein the display unit comprises:
   a transparent substrate layer;
   a switch array layer on the transparent substrate layer;
   a light emission layer on the switch array layer; and
   an electrode layer on the light emission layer.

5. The smart contact lens of claim 4, wherein the transparent substrate layer comprises:
   a microlens array including a plurality of microlenses, a distribution density of the plurality of microlens being varied in the microlens array.

6. The smart contact lens of claim 4, wherein the light emission layer comprises:
   a light emission device array having a plurality of light emission devices, a distribution density of the plurality of light emission devices being varied in the light emission device array.

7. The smart contact lens of claim 6, wherein the distribution density is highest in a center region of the light emission device array and decreases in a direction away from a center of the light emission device array.

8. The smart contact lens of claim 6, wherein the transparent substrate layer comprises:
   a microlens array including a plurality of microlenses, a distribution density of the plurality of microlenses being varied in the microlens array, the plurality of light emission devices correspond to the plurality of microlenses.

9. The smart contact lens of claim 8, wherein the electrode layer includes first and second electrodes, the first and second electrodes being between 5% to about 15% of the electrode layer.

10. The smart contact lens of claim 1, wherein the peripheral device comprises:
    an antenna;
    a capacitor configured to supply power to the display unit and a portion of the peripheral device;
    a control unit configured to control operations of the display unit and the peripheral device;
    a motion sensor configured to detect movement of the smart contact lens; and
    a thin-film camera.

11. A method of manufacturing a smart contact lens, the method comprising:
    forming a display unit;
    mounting the display unit in a center region of a first contact lens, the mounting including, forming a groove in the center region of the first contact lens, and disposing the display unit in the groove, a size of the groove corresponding to a size of the display unit;
    forming a peripheral device on the first contact lens, around the display unit and in connection with the display unit; and
    forming a passivation layer to cover the display unit and the peripheral device.

12. The method of claim 11, wherein the forming of the display unit comprises:
forming a transparent substrate layer on a curved surface of a mold layer;
transferring a switch array layer to the transparent substrate layer;
transferring a light emission layer to the switch array layer; and
forming wires to connect devices of the switch array layer with devices of the light emission layer.

13. The method of claim 12, wherein the transferring the switch array layer and the light emission layer including transfer-printing.

14. The method of claim 12, wherein the transparent substrate layer comprises:
a microlens array including a plurality of microlenses, the microlens array having a varying microlens distribution density.

15. The method of claim 12, wherein the light emission layer comprises:
a light emission device array having a plurality of light emission devices, the light emission device array having a varying light emission device distribution density.

16. The method of claim 12, wherein the wires have a pop-up structure or a filamentary serpentine structure.

17. The method of claim 12, wherein the transferring the light emission layer comprises:
forming an array comprising a plurality of light emission devices on a silicon substrate;
transferring the array to a flexible substrate;
deforming the flexible substrate in a curved shape such that the array has a curvature corresponding to the curved surface of the mold layer; and
transferring the array to the switch array layer and removing the flexible substrate.

18. The method of claim 11, further comprising:
forming a material layer on the first contact lens to cover the passivation layer.

19. The method of claim 18, wherein the material layer includes the same material as a material used to form the first contact lens.

20. The method of claim 11, further comprising:
forming a second contact lens on the first contact lens to cover the passivation layer.

21. The method of claim 11, wherein the forming the peripheral device comprises:
forming a device layer on a substrate;
separating the device layer from the substrate;
flattening the first contact lens by pulling the first contact lens in radial directions;
transferring the device layer to the flattened first contact lens;
forming wires to connect the device layer and the display unit; and
returning the first contact lens to an original shape.

22. The method of claim 21, wherein the wires have a filamentary serpentine structure.

23. A method of operating a smart contact lens, the method comprising:
receiving information;
transmitting the information to a display unit; and
projecting light directly onto a retina using the display unit, the light including the information,
wherein the smart contact lens includes a passivation layer covering the display unit, a groove in a center region of the smart contact lens, the display unit is in the groove and a size of the groove corresponds to a size of the display unit.

24. The method of claim 23, wherein the receiving receives the information from an external device.

25. The method of claim 24, wherein the external device comprises:
a program interacting with the smart contact lens.

26. The method of claim 24, wherein prior to the receiving the information, the method further comprises:
detecting an object, the object being in view of a wearer of the smart contact lens;
capturing an image of the object; and
providing the image to the external device.

27. The method of claim 26, wherein the providing the image to the external device comprises:
sending a search request signal related to the object to the external device.

28. The method of claim 26, wherein the information comprises search results related to the object.

29. The method of claim 24, wherein the information is provided by the external device.

* * * * *